(12) United States Patent
Miyasako

(10) Patent No.: US 9,282,246 B2
(45) Date of Patent: *Mar. 8, 2016

(54) BLUR CORRECTION APPARATUS AND IMAGE CAPTURE APPARATUS

(71) Applicant: CANON KABUSHIKI KAISHA, Tokyo (JP)

(72) Inventor: Kenichi Miyasako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,056

(22) Filed: Oct. 15, 2014

(65) Prior Publication Data

US 2015/0029348 A1    Jan. 29, 2015

Related U.S. Application Data

(63) Continuation of application No. 12/828,481, filed on Jul. 1, 2010, now Pat. No. 8,896,716.

(30) Foreign Application Priority Data

Jul. 15, 2009 (JP) .................................. 2009-167266

(51) Int. Cl.
*H04N 5/232* (2006.01)
*G02B 27/64* (2006.01)

(52) U.S. Cl.
CPC .......... *H04N 5/23261* (2013.01); *G02B 27/646* (2013.01); *H04N 5/23248* (2013.01); *H04N 5/23258* (2013.01); *H04N 5/23287* (2013.01)

(58) Field of Classification Search
None
See application file for complete search history.

(56) References Cited

U.S. PATENT DOCUMENTS

2003/0142218 A1*  7/2003  Yamazaki .................. 348/208.6

* cited by examiner

*Primary Examiner* — Roberto Velez
*Assistant Examiner* — Yih-Sien Kao
(74) *Attorney, Agent, or Firm* — Cowan, Liebowitz & Latman, P.C.

(57) ABSTRACT

Upon detecting the start of a panning operation, an adder-subtractor applies an offset from an offset change circuit to the output of an HPF (High-Pass Filter) representing the shake amount of an image capturing apparatus to decrease the shake amount. The offset value is set to be larger as the value of shake correction data output from a focal length calculation circuit is closer to the correction limit of a blur correction circuit. Upon detecting the end of the panning operation, the offset value is returned to zero. This invention provides a blur correction apparatus capable of suppressing degradation of a blur correction effect even when in a panning state.

8 Claims, 19 Drawing Sheets

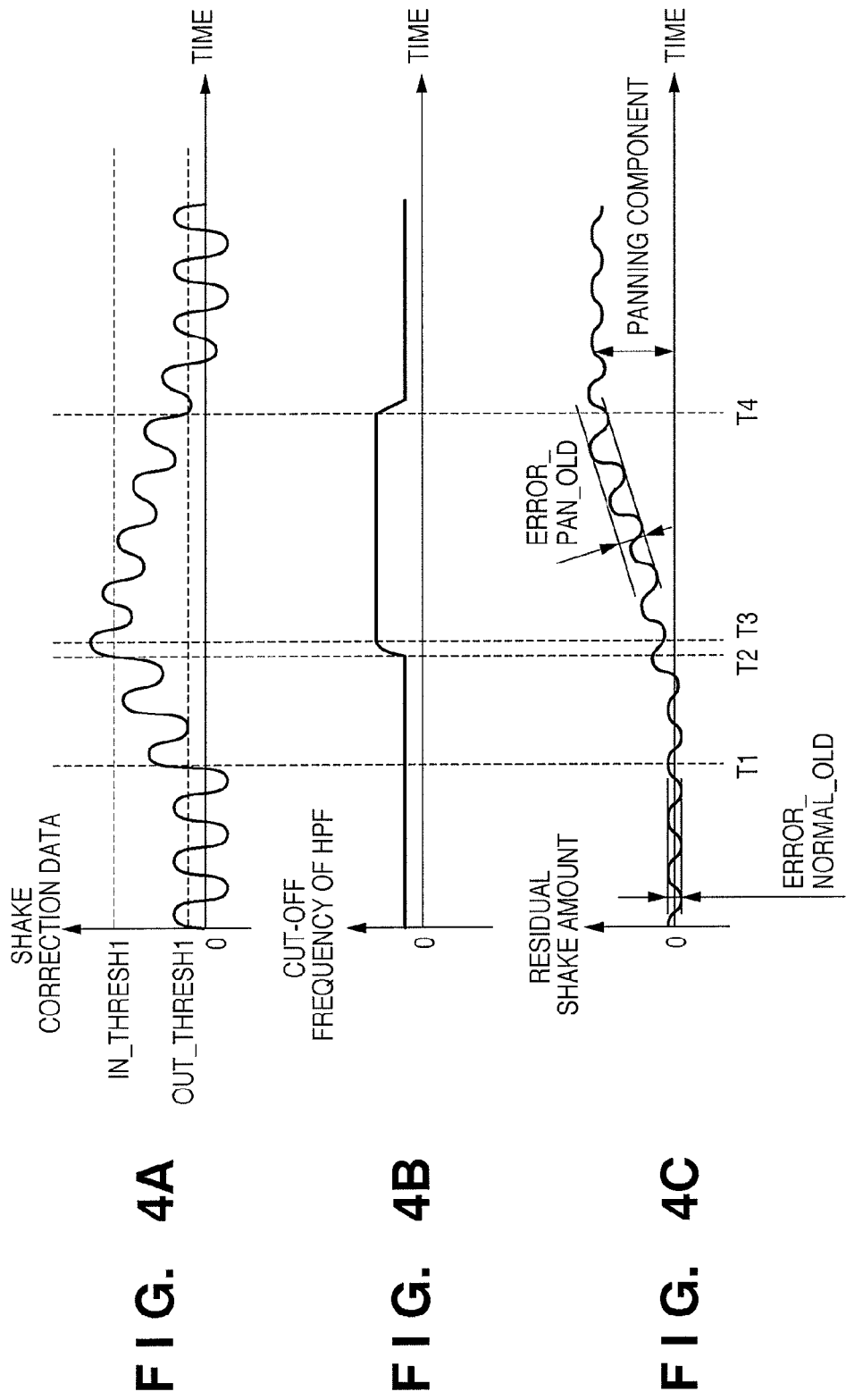

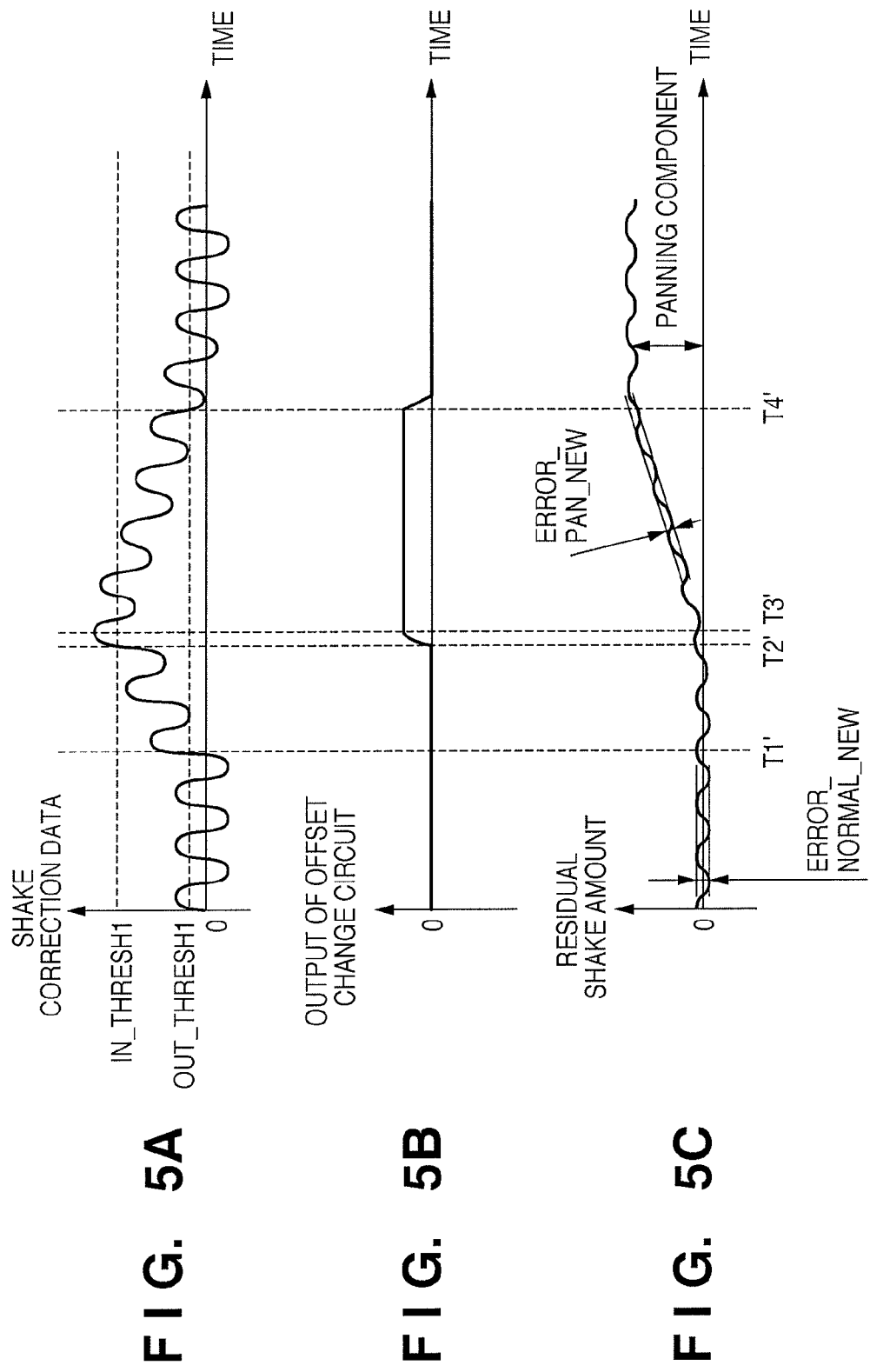

FIG. 14A
ANGULAR VELOCITY DATA
IN_THRESH3
OUT_THRESH3
0
TIME

FIG. 14B
CUT-OFF FREQUENCY OF HPF
0
TIME

FIG. 14C
ANGULAR DISPLACEMENT DATA
WITHOUT PANNING CONTROL
WITH PANNING CONTROL
0
T54
TIME

FIG. 14D
REPLACEMENT SIGNAL DATA
0
TIME

FIG. 14E
ANGULAR DISPLACEMENT DATA
WITHOUT PANNING CONTROL
WITH PANNING CONTROL
IN_THRESH2
OUT_THRESH4
0
T51 T52 T53
TIME

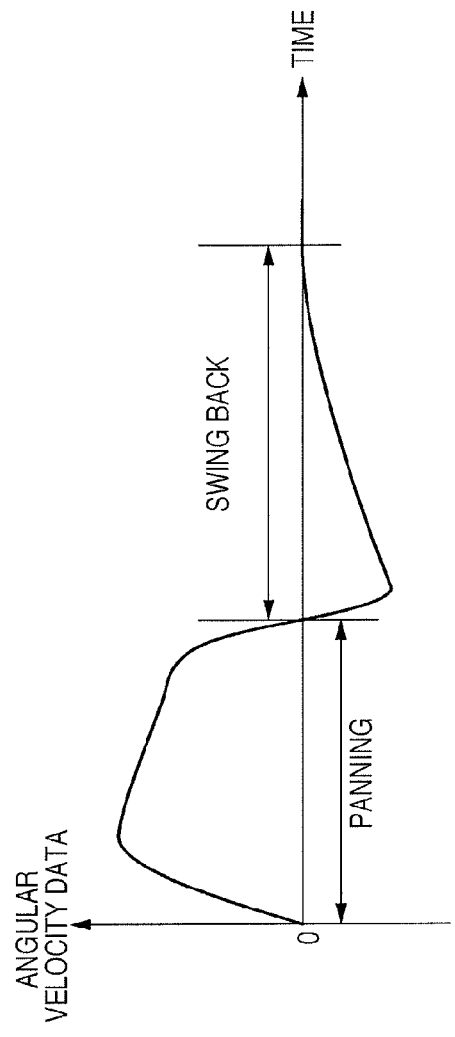
F I G. 16A
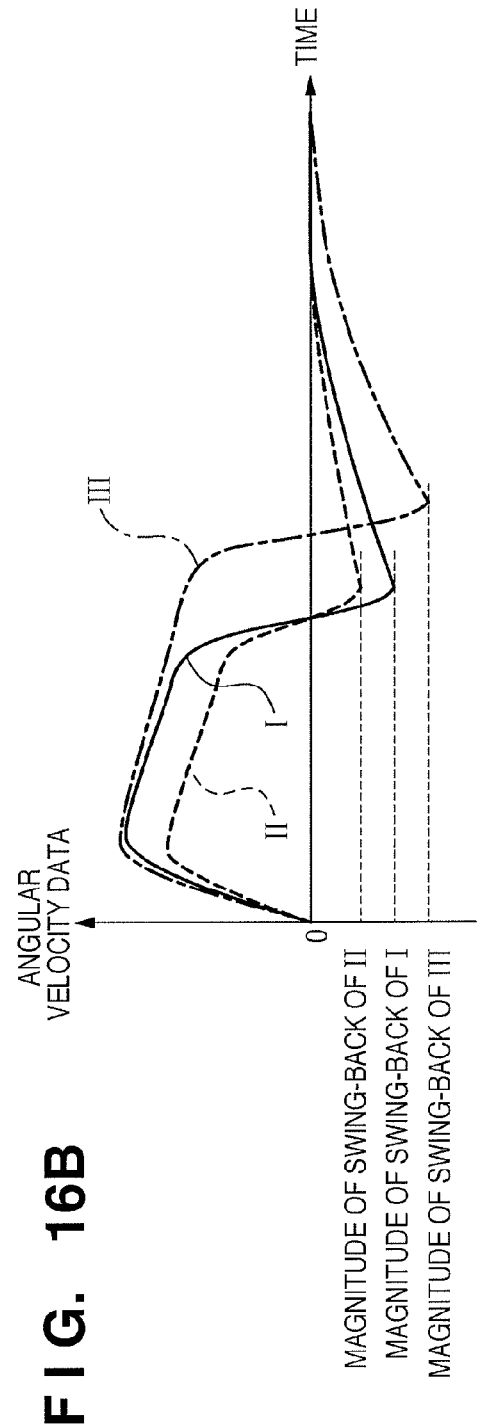
F I G. 16B

F I G. 18A
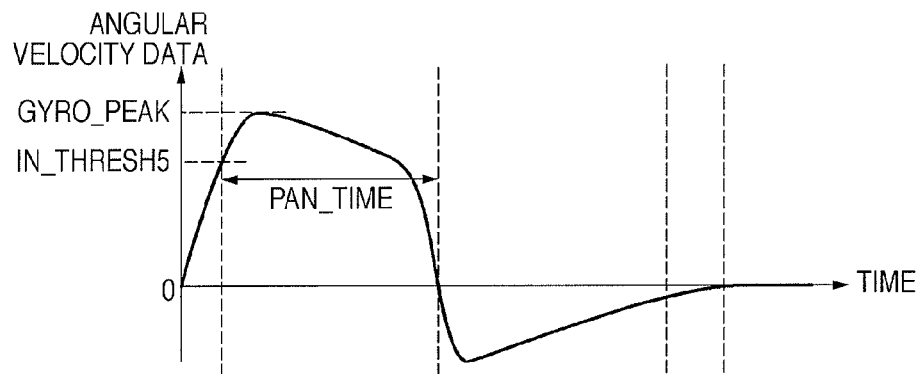
F I G. 18B
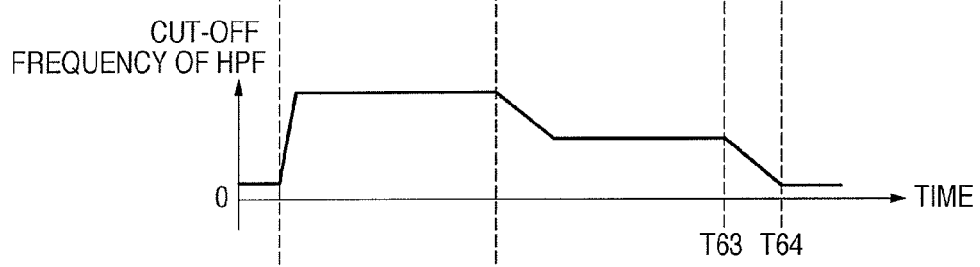
F I G. 18C
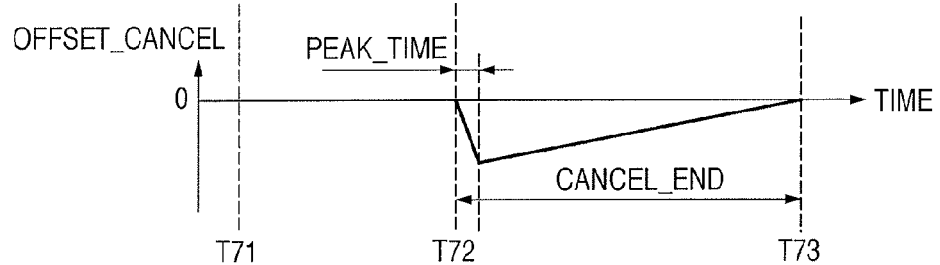

BLUR CORRECTION APPARATUS AND IMAGE CAPTURE APPARATUS

CROSS-REFERENCE TO RELATED APPLICATION

This application is a continuation of application Ser. No. 12/828,481, filed Jul. 1, 2010, the entire disclosure of which is hereby incorporated by reference.

BACKGROUND OF THE INVENTION

1. Field of the Invention

The present invention relates to a blur correction apparatus that corrects blur in a captured image caused by motion (shake) of an image capturing apparatus. The present invention also relates to an image capturing apparatus comprising the blur correction apparatus.

2. Description of the Related Art

Quality degradation of a captured image is mainly caused by motion of the image capturing apparatus called device shake or camera shake during exposure, which is especially problematic due to recent size reductions in image capturing apparatuses or increases in the magnification of a zoom lens. Accordingly, a blur correction apparatus for reducing the influence (blur) of device shake on a captured image has been proposed.

On the other hand, there exists an image capturing method such as follow shot that captures an image while intentionally moving the image capturing apparatus. It is not preferable to apply blur correction without making a distinction between device shake and such an intended movement of an image capturing apparatus. Hence, determining whether the motion of an image capturing apparatus is intentional movement or device shake and correcting the blur correction sensitivity in accordance with the determination result is known.

For example, Japanese Patent No. 3186219 discloses suppressing the response of the blur correction function for the frequency components of panning when the image capturing apparatus is determined to be panning.

For example, a blur correction apparatus mounted on an image capturing apparatus has an arrangement as shown in FIG. 19. In a blur correction apparatus 10, an angular velocity sensor 11 is attached to the image capturing apparatus main body (not shown) to detect its shake as a signal representing an angular velocity. A DC cut filter 12 cuts off the DC (Direct Current) component of the angular velocity signal output from the angular velocity sensor 11, and passes only the AC component, that is, the vibrational component. An amplifier 13 amplifies the angular velocity signal output via the DC cut filter 12, and outputs it. An A/D (Analog/Digital) converter 14 digitizes the angular velocity signal amplified by the amplifier 13, and outputs it.

An HPF (High-Pass Filter) 15, integrator 16, focal length calculation circuit 17, and panning control circuit 18 are implemented by, for example, causing a microcomputer 20 to execute software stored in a nonvolatile memory (not shown).

The HPF 15 cuts off, out of the frequency components of the digital angular velocity signal (angular velocity data) output from the A/D converter 14, low-frequency components equal to or lower than a preset lower cut-off frequency, and outputs high-frequency components higher than the lower cut-off frequency. The integrator 16 integrates the high-frequency components of the angular velocity data output from the HPF 15, and outputs the integration result as angular displacement data. The focal length calculation circuit 17 detects the focal length of the zoom lens provided in the image capturing apparatus (not shown). The focal length calculation circuit 17, for example, acquires the current zoom position of the zoom lens of the image capturing apparatus from a zoom encoder, and computes the focal length (angle of view) of the zoom lens based on the zoom position, thereby detecting the focal length. Based on the focal length and the above-described angular displacement data, the focal length calculation circuit 17 then computes shake correction data for use in the correction of a shake of the optical axis of the image sensor. A blur correction circuit 19 corrects the shake of the optical axis of the image capturing apparatus in accordance with the shake correction data.

The blur correction circuit 19 can be either an optical blur correction circuit which corrects a blur by driving the correction lens in a direction perpendicular to the optical axis and decentering the optical axis, or an electronic blur correction circuit which corrects a blur by moving a region to be read out from the image sensor. Alternatively, it may be a sensor shift blur correction circuit which moves the image sensor in a plane perpendicular to the optical axis.

Based on the angular velocity data output from the A/D converter 14 and the angular displacement data output from the integrator 16, the panning control circuit 18 determines whether the image capturing apparatus is panning (panning determination). More specifically, for example, if the angular velocity data is equal to or more than a predetermined threshold, or if the angular velocity data is less than a predetermined threshold but the angular displacement data (integration result) is equal to or more than a predetermined threshold, the image capturing apparatus is determined to be panning.

The panning control circuit 18 then performs panning control in accordance with the panning determination result. In panning control, first, the lower cut-off frequency of the HPF 15 is gradually raised to reduce the shake frequency domain where blur correction functions. In addition, the value of the time constant to be used for the integral operation of the integrator 16 is gradually made smaller. Accordingly, the blur correction position gradually moves to the center of the moving range so that the value of the angular displacement data output from the integrator 16 gradually approaches the reference value (a possible value in a state without a shake).

On the other hand, upon determining that the image capturing apparatus is not in the panning state, the panning control circuit 18 gradually lowers the lower cut-off frequency of the HPF 15, and gradually increases the value of the time constant to be used for the integral operation of the integrator 16. Accordingly, the lower cut-off frequency of the HPF 15 and the value of the time constant to be used for the integral operation of the integrator 16 return to their initial states so that the panning control is canceled.

For example, Japanese Patent No. 3186219 discloses a method of controlling the HPF 15 and the integrator 16 in the above-described panning mode.

However, the frequency band of the panning operation ranges approximately from DC to 1 Hz, and the frequency band of a camera shake or a body shake ranges approximately from 1 Hz to 10 Hz. That is, the frequency bands are very close. For this reason, the conventional technique disclosed in Japanese Patent No. 3186219 has the following problem.

Upon determining the panning state, the lower cut-off frequency of the HPF 15 and the value of the time constant in the integrator 16 are controlled to increase the signal attenuation amount of the frequency component of panning. At this time, the signal attenuation amount of the frequency component of a camera shake or a body shake during walking also increases. This results in a smaller blur correction effect when the image capturing apparatus is determined to be in the panning state than when it is determined not to be.

SUMMARY OF THE INVENTION

The present invention has been made in consideration of the above-described problem of the prior art, and has as its object to provide a blur correction apparatus capable of suppressing degradation of the blur correction effect even in a panning state.

According to an aspect of the present invention, there is provided a blur correction apparatus comprising: a detection unit adapted to detect a shake of the blur correction apparatus and output a signal representing the detected shake; a correction data calculation unit adapted to compute, based on the output signal of the detection unit, shake correction data for use in the correction of a blur of an image caused by the shake; a control unit adapted to detect a panning operation by detecting that an absolute value of the shake correction data has exceeded a predetermined first threshold; a generation unit adapted to generate an offset value to be subtracted from the output signal of the detection unit when the control unit detects the panning operation; and a subtraction unit adapted to subtract the offset value from the output signal of the detection unit, wherein the generation unit generates the offset value having a value corresponding to a magnitude of the output signal of the detection unit, during the time in which the control unit detects the panning operation.

According to another aspect of the present invention, there is provided a blur correction apparatus comprising: a detection unit adapted to detect a shake of the blur correction apparatus and output a signal representing the shake; a generation unit adapted to generate an offset value to be applied to the output signal of the detection unit; an application unit adapted to apply the offset value to the output signal of the detection unit; a correction data calculation unit adapted to compute, based on an output of the application unit, shake correction data for use in the correction of a blur of an image caused by the shake; and a control unit adapted to detect a panning operation and controlling the generation unit, wherein the control unit detects the panning operation by detecting that an absolute value of the shake correction data has exceeded a predetermined first threshold, and detects an end of the panning operation by detecting that the absolute value of the shake correction data has fallen below a second threshold, and the control unit controls the generation unit so as to generate the offset value to decrease the magnitude of the signal to be output from the detection unit during a time from detection of the panning operation to detection of the end of the panning operation, and set the offset value to zero upon detecting the end of the panning operation.

According to further aspect of the present invention, there is provided an image capturing apparatus having an imaging optical system including a correction optical system, comprising: a detection unit adapted to detect a shake of the image capturing apparatus and output a signal representing the shake; a correction unit adapted to correct a blur of an image caused by the shake by driving the correction optical system based on the output signal of the detection unit; a control unit adapted to detect a panning operation of the image capturing apparatus based on the output signal of the detection unit; a generation unit adapted to generate an offset value to be subtracted from the output signal of the detection unit when the control unit detects the panning operation; and a subtraction unit adapted to subtract the offset value from the output signal of the detection unit, wherein during the time in which the control unit detects the panning operation, the generation unit increases the offset value along with an increase in the output signal of the detection unit so as to make the correction unit drive the correction optical system in a direction of a center of an optical axis of the imaging optical system.

According to yet further aspect of the present invention, there is provided a blur correction apparatus comprising: a detection unit adapted to detect a shake of the blur correction apparatus and output a signal representing the shake; a correction data calculation unit adapted to compute, based on the output of the detection unit, shake correction data for use in the correction of a blur of an image caused by the shake; a control unit adapted to detect a panning operation and an end of the panning operation, the control unit detecting the panning operation by detecting that an absolute value of the shake correction data has exceeded a predetermined first threshold, and detecting the end of the panning operation by detecting that the absolute value of the shake correction data has fallen below a second threshold, and a magnitude of the output signal of the detection unit is smaller than a third threshold; a generation unit adapted to generate an offset value to be subtracted from the output signal of the detection unit when the control unit detects the panning operation; and a subtraction unit adapted to subtract the offset value from the output signal of the detection unit, wherein when the control unit detects the end of the panning operation, the generation unit sets the offset value to zero.

According to further aspect of the present invention, there is provided a blur correction apparatus comprising: a detection unit adapted to detect a shake of the blur correction apparatus and outputting a signal representing the shake; a generation unit adapted to generating an offset value to be applied to the output signal of the detection unit; an application unit adapted to apply the offset value to the output signal of the detection unit; a correction data calculation unit adapted to compute, based on an output of the application unit, shake correction data for use in the correction of a blur of an optical axis of an imaging optical system of an image capturing apparatus; and a control unit adapted to detect a panning operation and controlling the generation unit, wherein the control unit detects the panning operation by detecting that an absolute value of the shake correction data has exceeded a predetermined first threshold, and detects an end of the panning operation by detecting that the absolute value of the shake correction data has fallen below a second threshold, and the magnitude of the output signal of the detection unit is smaller than a third threshold, and the control unit controls the generation unit so as to generate the offset value to decrease the output signal to be output from the detection unit during a time from detection of the panning operation to detection of the end of the panning operation, and set the offset value to zero upon detecting the end of the panning operation.

Further features of the present invention will become apparent from the following description of embodiments with reference to the attached drawings.

Figure 2A:
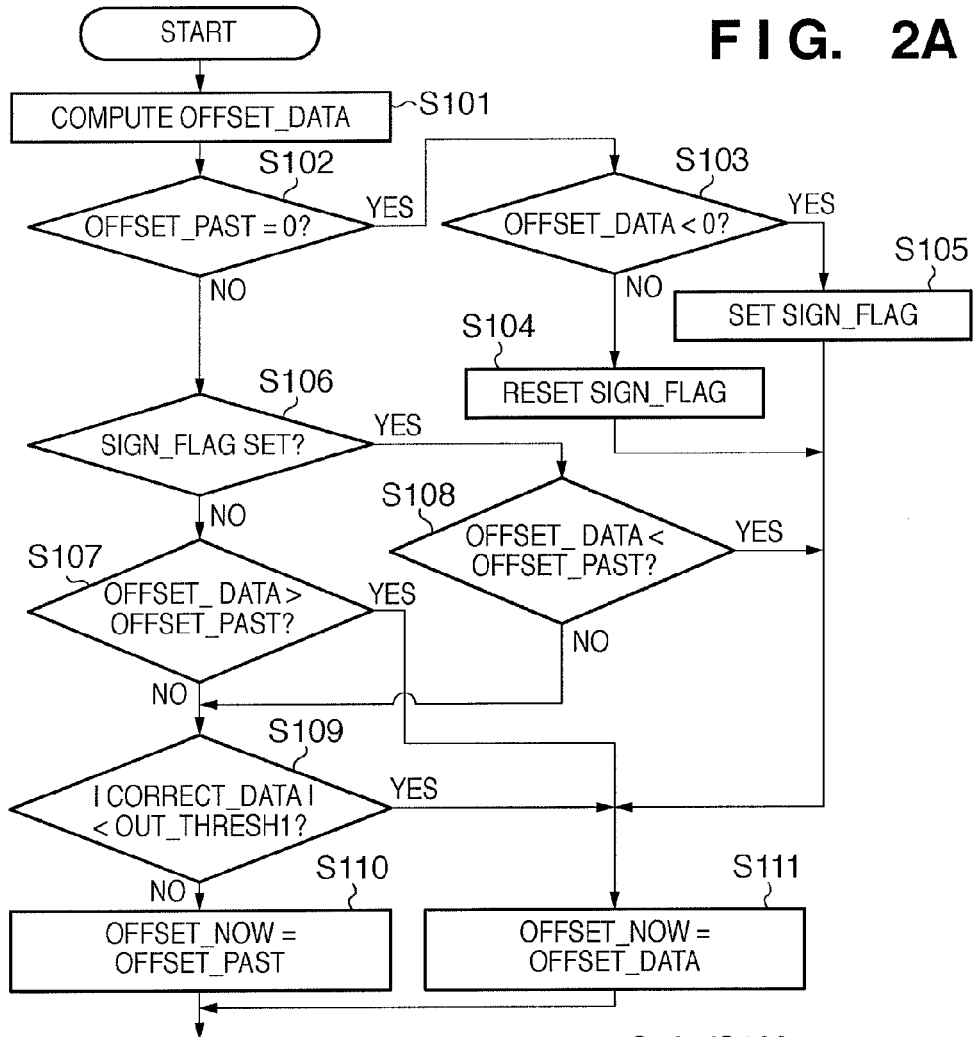
FIG. 2A is a flowchart for explaining panning control processing performed by a panning control circuit 112 according to the first embodiment.
Figure 3:
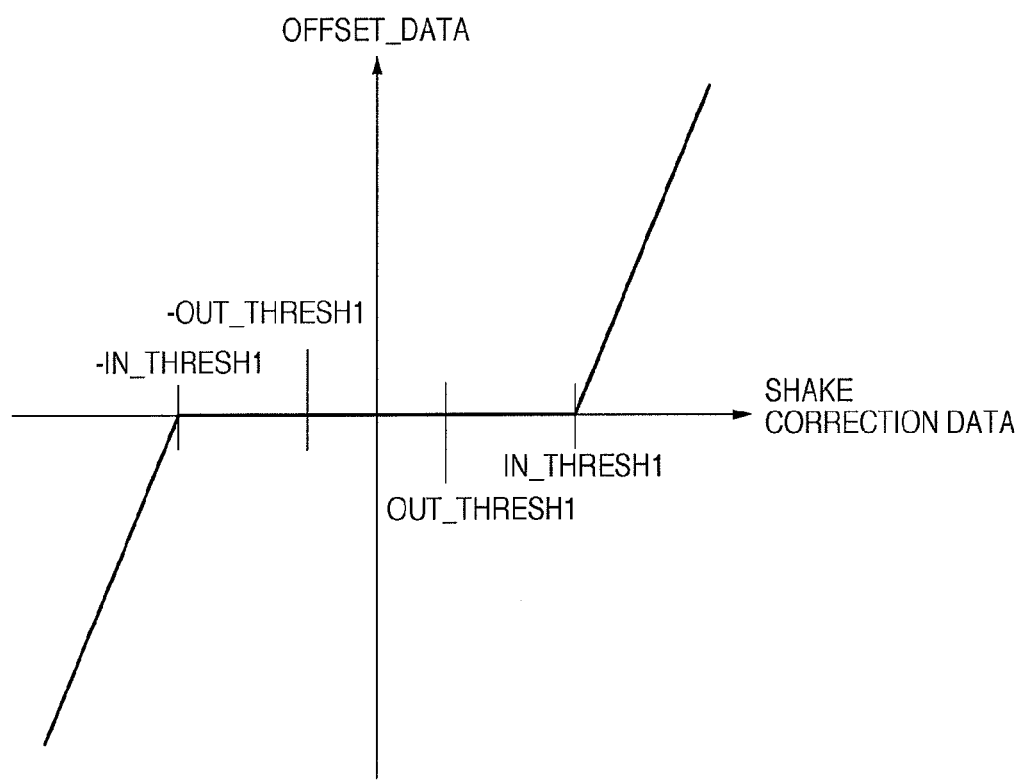
Figure 6A:
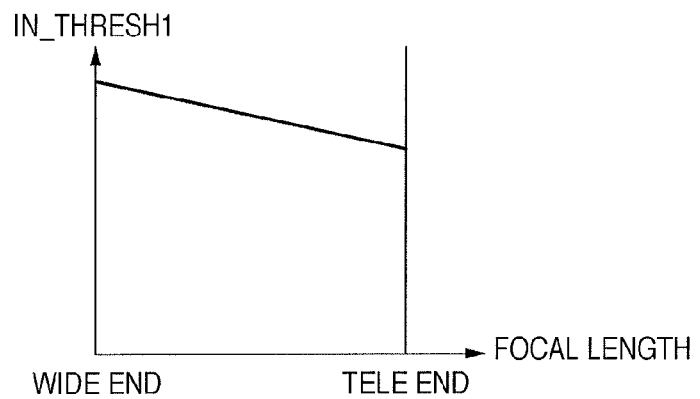
Figure 6B:
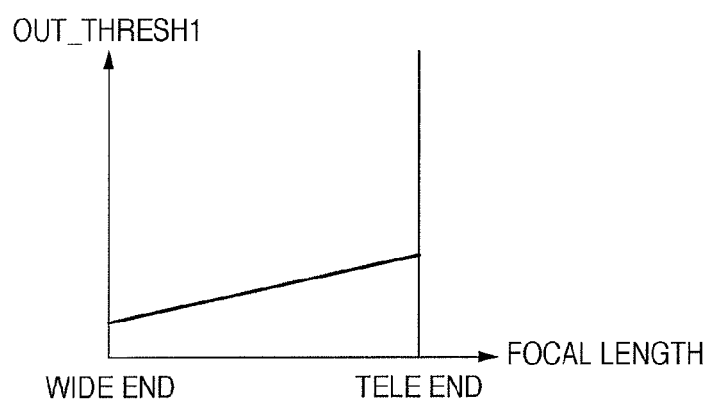
Figure 6C:
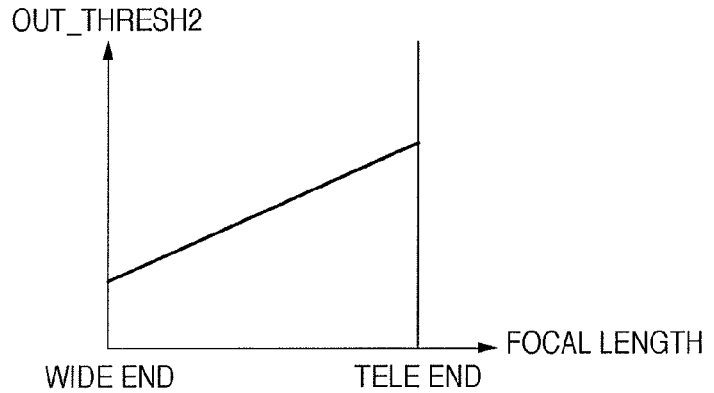
Figure 7A:
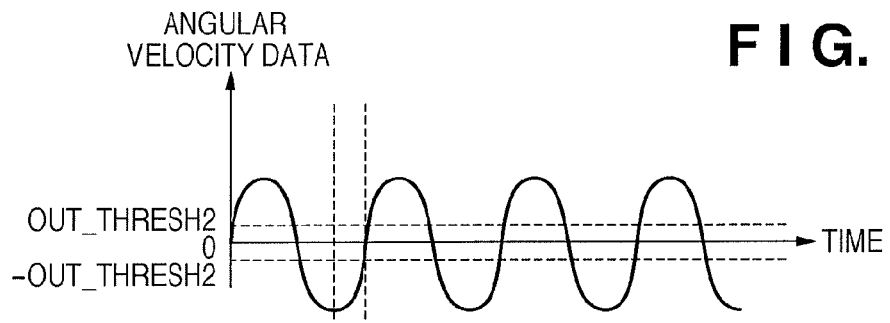
Figure 7B:
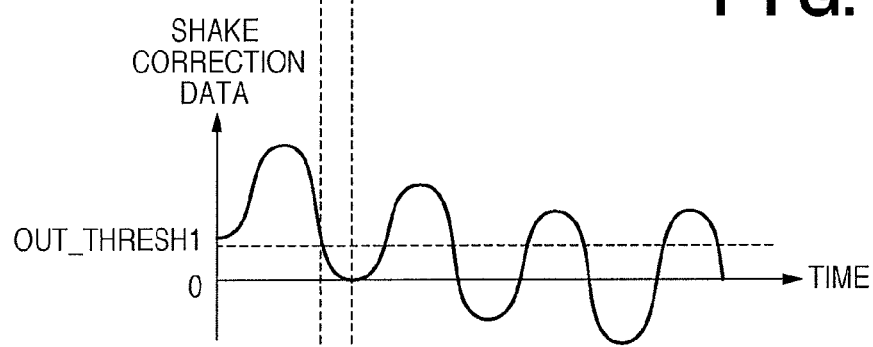
Figure 7C:
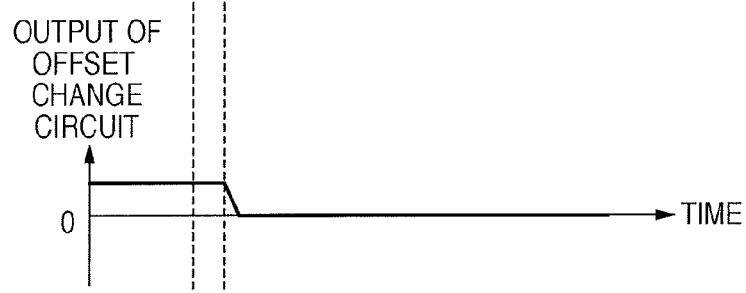
Figure 7D:
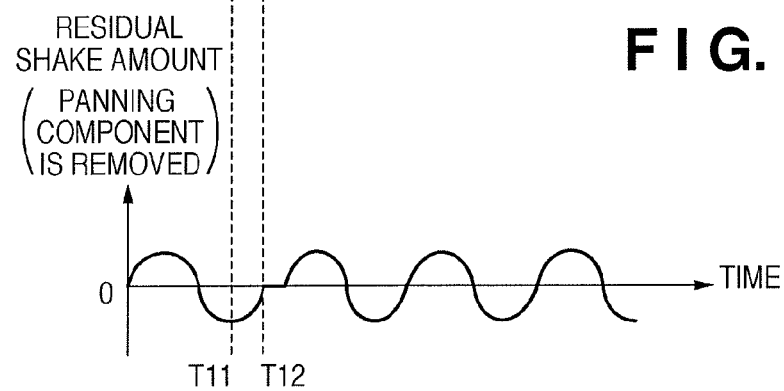
Figure 8:
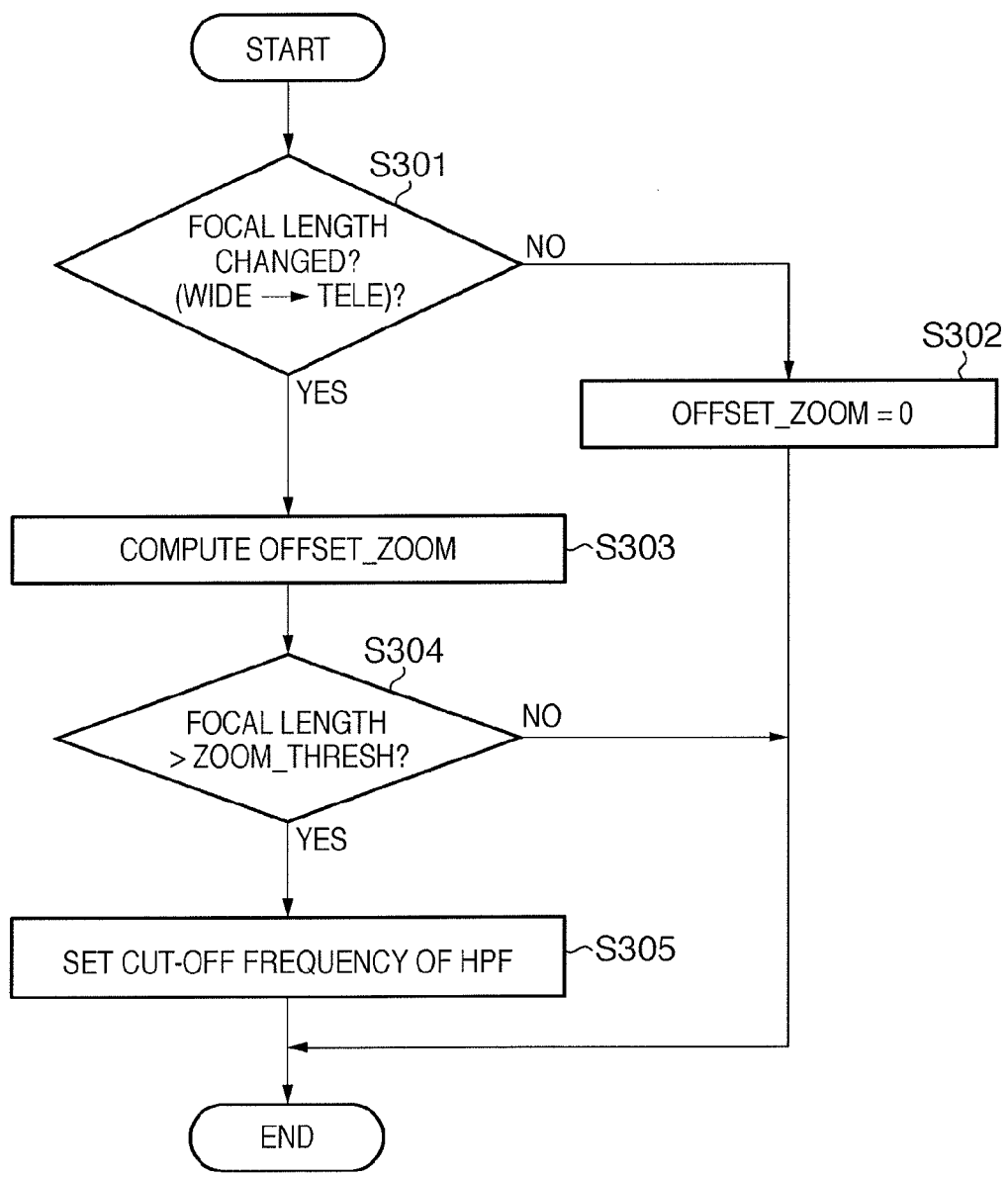
Figure 9A:
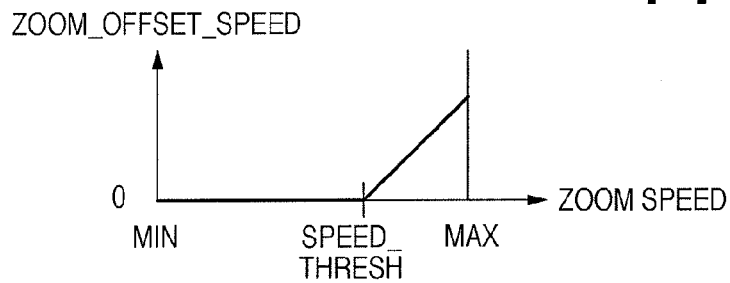
Figure 9B:
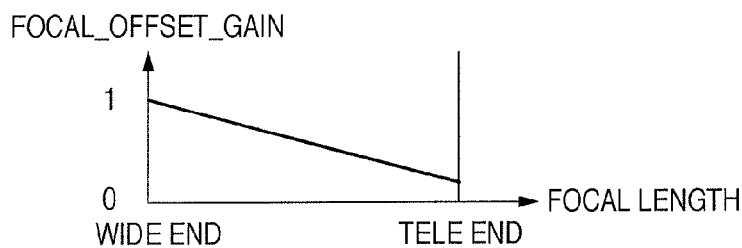
Figure 9C:
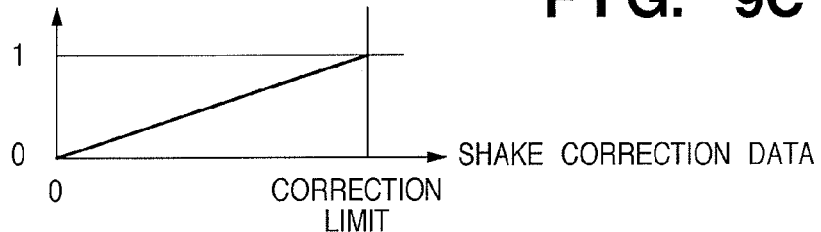
Figure 9D:
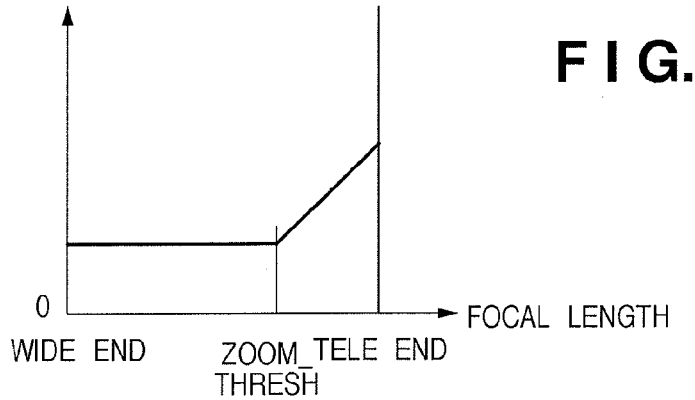
Figure 10A:
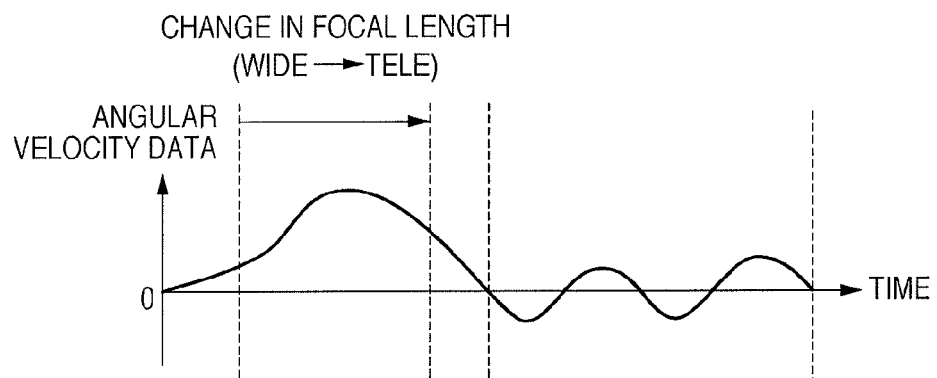
Figure 10B:
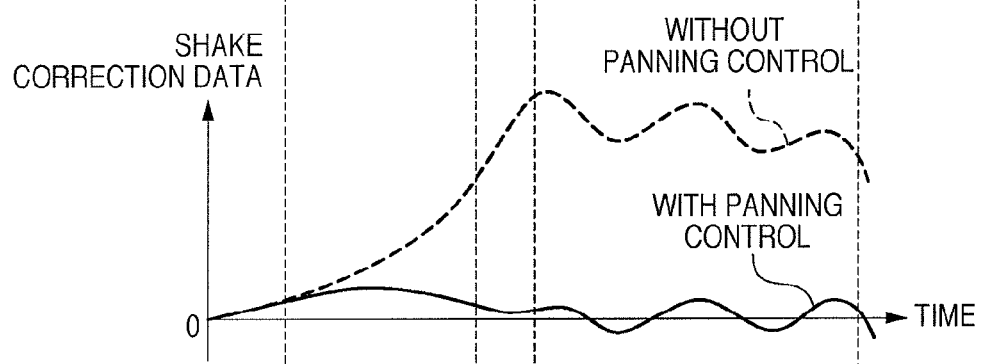
Figure 10C:
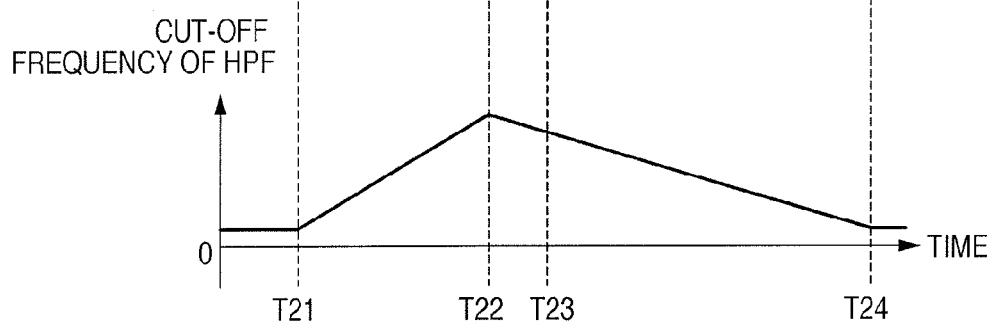
Figure 12A:
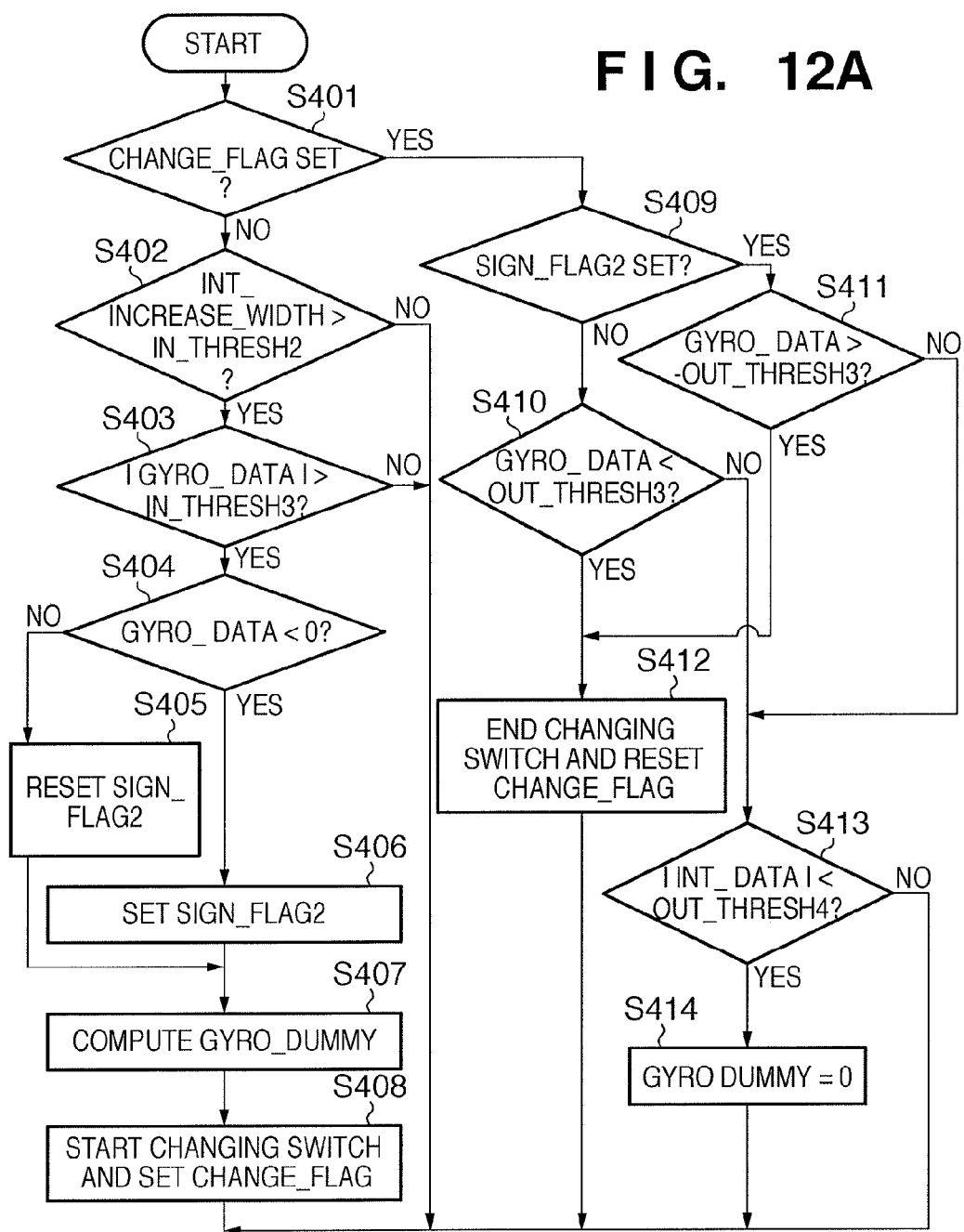
Figure 12B:
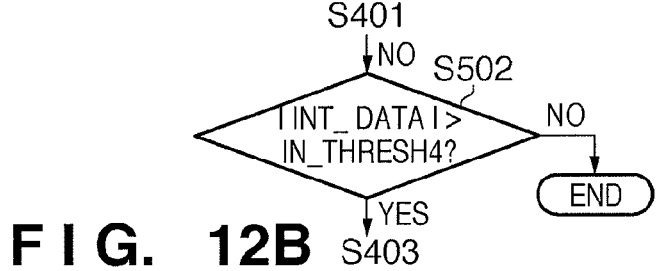
Figure 13:
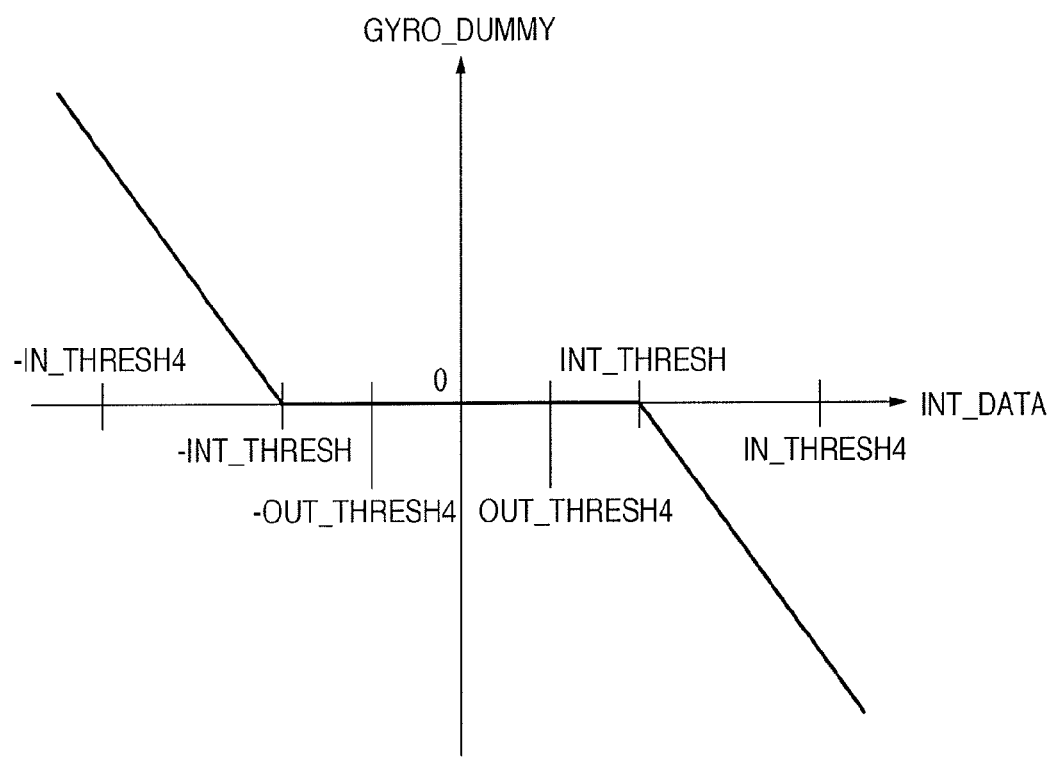
Figure 15:
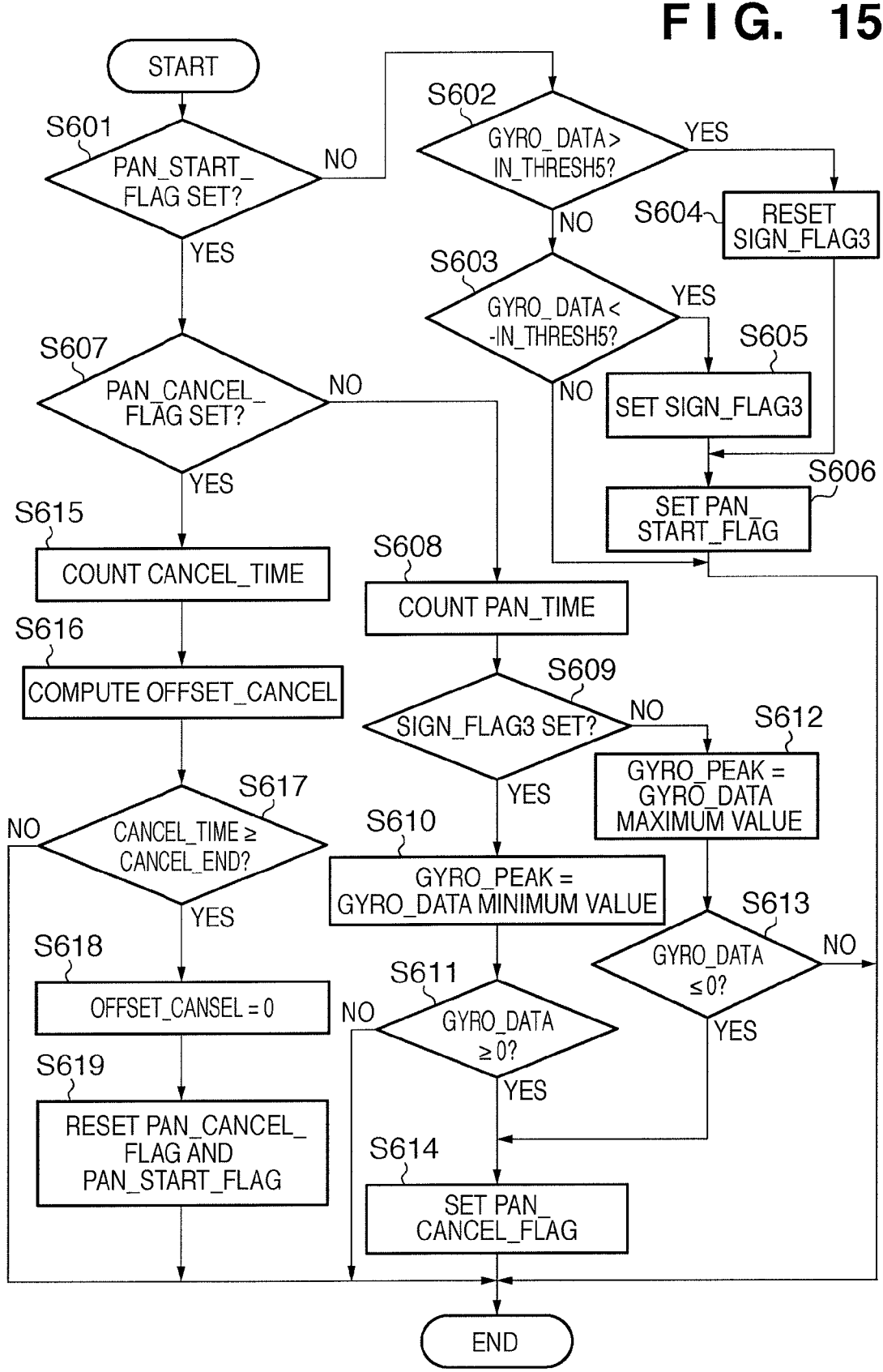
Figure 17A:
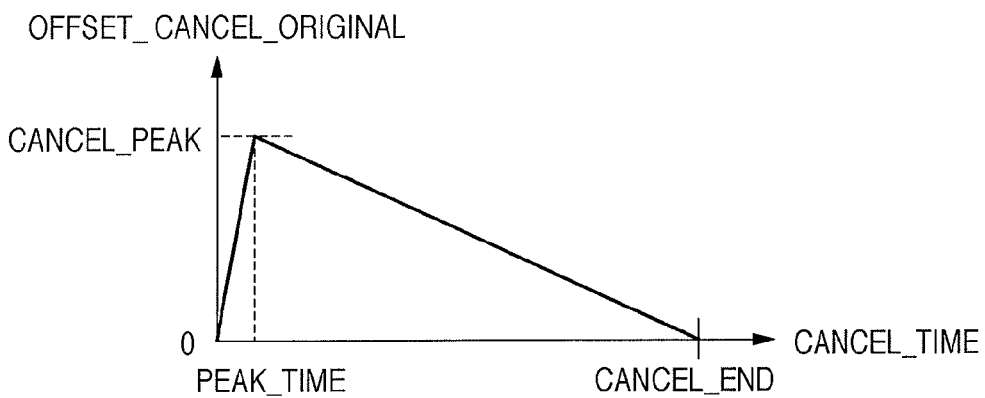
Figure 17B:
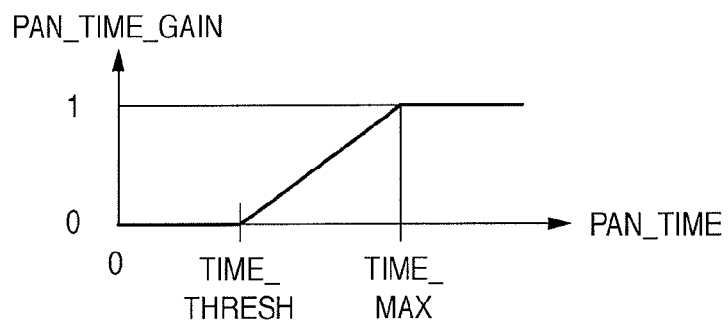
Figure 17C:
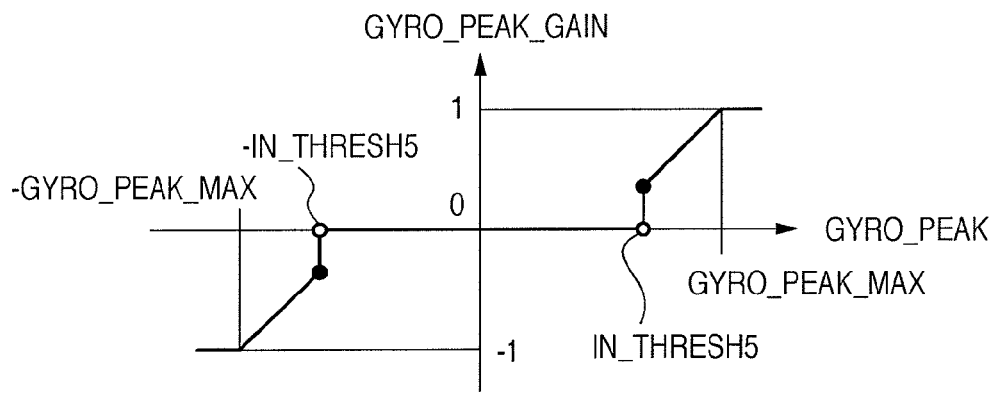
Figure 19:
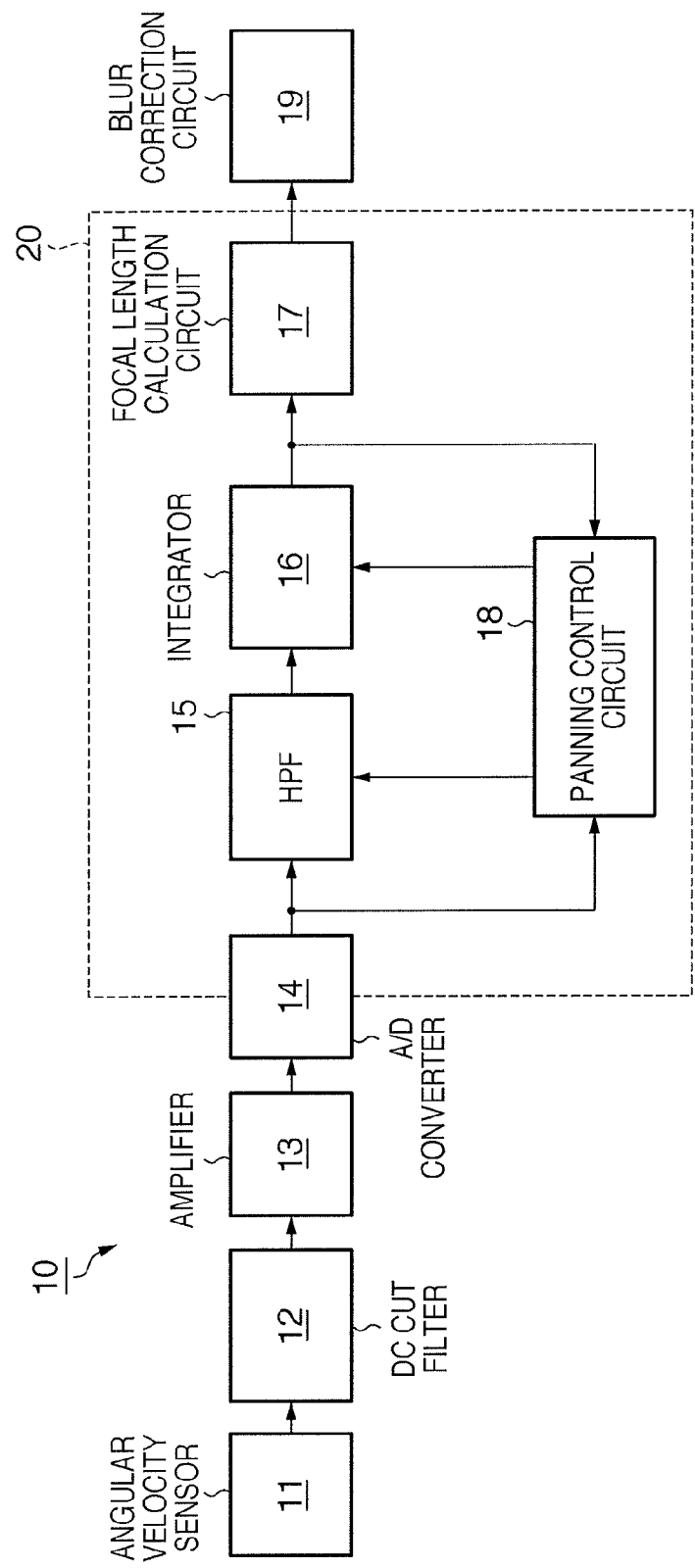

FIG. 3 is a view for explaining processing in step S101 of FIG. 2A;

FIGS. 4A to 4C are timing charts showing time-rate changes of shake correction data, the lower cut-off frequency of a BHPF 15, and the residual shake amount, respectively, when an image capturing apparatus including a conventional blur correction apparatus shown in FIG. 19 performs a panning operation;

FIGS. 5A to 5C are timing charts showing time-rate changes of shake correction data, the output (OFFSET_NOW) of an offset change circuit 106, and the residual shake amount, respectively, when an image capturing apparatus including a blur correction apparatus according to the first embodiment performs the same panning operation as in FIGS. 4A to 4C;

FIG. 6A is a graph showing the relationship between a panning start determination threshold IN_THRESH1 and the focal length of a zoom lens according to the second embodiment;

FIG. 6B is a graph showing the relationship between the focal length and the panning end determination threshold OUT_THRESH1;

FIG. 6C is a graph showing the relationship between the focal length and a panning end determination angular velocity threshold OUT_THRESH2 according to the fourth embodiment;

FIGS. 7A to 7C are timing charts showing time-rate changes of angular velocity data, shake correction data, and the output of an offset change circuit 106, respectively, at the end of the panning operation of a blur correction apparatus according to the third embodiment;

FIG. 7D is a timing chart showing a time-rate change of a value obtained by removing a panning component that need not be corrected from the difference between the actual shake amount at the end of the panning operation and the shake correction data output from a focal length calculation circuit 17;

FIG. 8 is a flowchart for explaining panning control processing performed by a panning control circuit 112 according to the fifth embodiment;

FIG. 9A is a graph showing the relationship between the zoom speed and ZOOM_OFFSET_SPEED according to the fifth embodiment;

FIG. 9B is a graph showing the relationship between the focal length and FOCAL_OFFSET_GAIN;

FIG. 9C is a graph showing the relationship between shake correction data CORRECT_DATA and CORRECT_OFFSET_GAIN;

FIG. 9D is a graph showing the relationship between the focal length and the lower cut-off frequency of an HPF 15;

FIGS. 10A to 10C are timing charts showing time-rate changes of angular velocity data, shake correction data, and the lower cut-off frequency of a CHPF 15, respectively, when the image capturing apparatus including the conventional blur correction apparatus performs a panning operation during high-speed zooming;

FIGS. 11A to 11D are timing charts showing time-rate changes of angular velocity data, shake correction data, the output of an offset change circuit 106, and the lower cut-off frequency of a DHPF 15, respectively, when an image capturing apparatus including a blur correction apparatus according to the fifth embodiment performs the same operation as in FIGS. 10A to 10C;

FIG. 12A is a flowchart for explaining panning control processing performed by a panning control circuit 112 according to the sixth embodiment of the present invention;

FIG. 12B is a flowchart for explaining, out of panning control processing performed by a panning control circuit 112 according to the seventh embodiment of the present invention, a processing step different from the sixth embodiment;

FIG. 13 is a graph showing the relationship between angular displacement data and the output signal of a signal replacement circuit 107 according to the sixth embodiment of the present invention;

FIGS. 14A to 14C are timing charts showing time-rate changes of angular velocity data, the lower cut-off frequency of an HPF 15, and angular displacement data output from an integrator 16, respectively, when the image capturing apparatus including the conventional blur correction apparatus performs an abrupt panning operation;

FIGS. 14D and 14E are timing charts showing time-rate changes of the output signal of the signal replacement circuit 107 and angular displacement data, respectively, when an image capturing apparatus including a blur correction apparatus according to the sixth embodiment performs an abrupt panning operation;

FIG. 15 is a flowchart for explaining panning control processing performed by a panning control circuit 112 according to the eighth embodiment of the present invention;

FIG. 16A is a timing chart showing a time-rate change of the output (angular velocity data) of an A/D converter 14 when a panning operation is performed;

FIG. 16B is a timing chart showing a time-rate change of the angular velocity data when three kinds of panning operations are performed;

FIG. 17A is a graph showing the relationship between a time CANCEL_TIME from the end of a panning operation and OFFSET_CANCEL_ORIGINAL according to the eighth embodiment;

FIG. 17B is a graph showing the relationship between PAN_TIME and PAN_TIME_GAIN according to the eighth embodiment;

FIG. 17C is a graph showing the relationship between GYRO_PEAK and GYRO_PEAK_GAIN according to the eighth embodiment;

FIGS. 18A and 18B are timing charts showing time-rate changes of angular velocity data and the lower cut-off frequency of an HPF 15, respectively, when the image capturing apparatus including the conventional blur correction apparatus performs a panning operation;

FIG. 18C is a timing chart showing a time-rate change of the output of an offset change circuit 106 when an image capturing apparatus including a blur correction apparatus according to the eighth embodiment performs the same panning operation as in FIG. 18A; and FIG. 19 is a block diagram showing an example of the arrangement of a conventional blur correction apparatus.

DESCRIPTION OF THE EMBODIMENTS

Preferred embodiments of the present invention will now be described in detail in accordance with the accompanying drawings.

Figure 1:
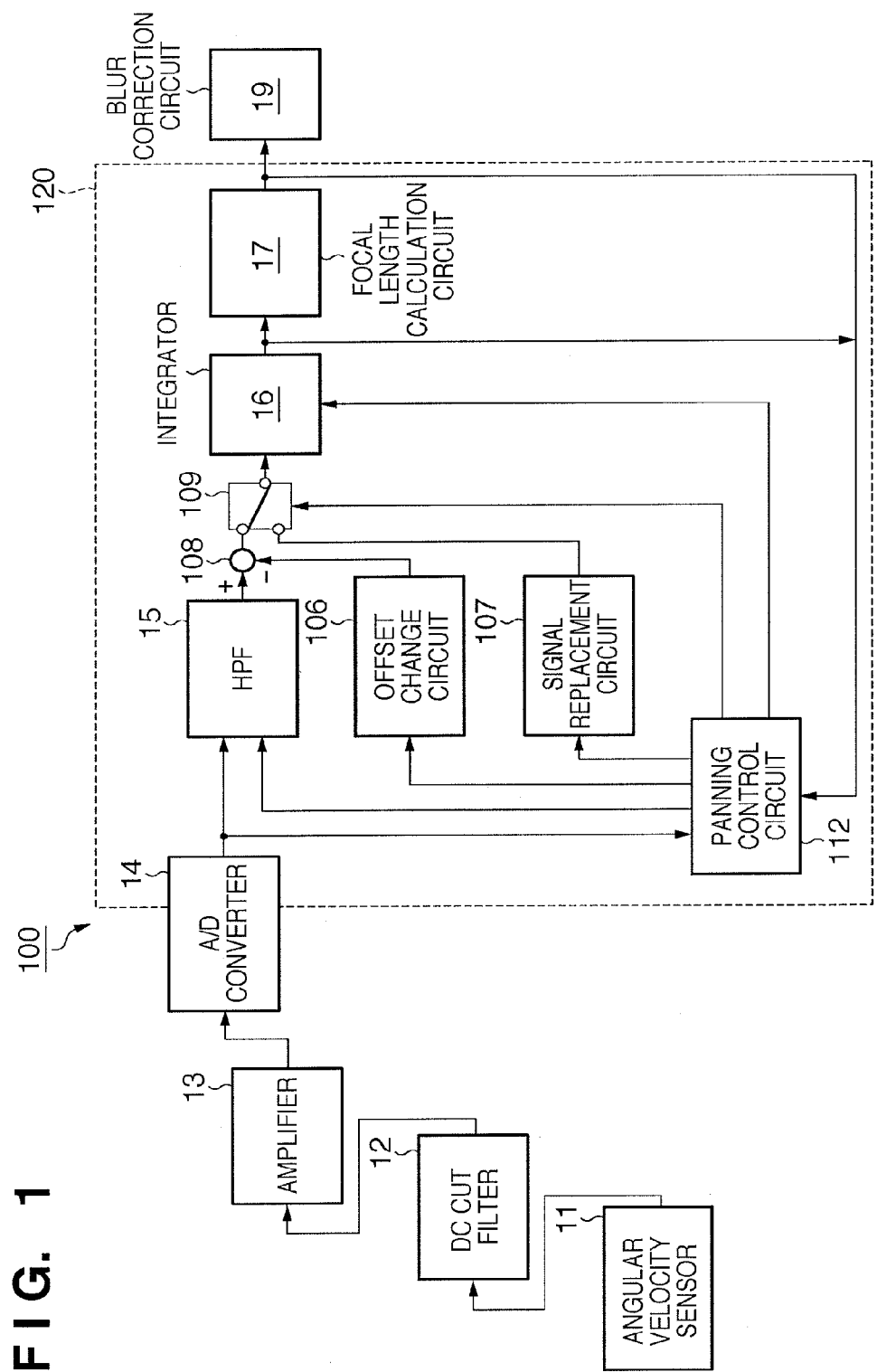
FIG. 1 is a block diagram showing an example of the arrangement of a blur correction apparatus according to an embodiment of the present invention.

FIG. 1 is a block diagram showing an example of the arrangement of a blur correction apparatus capable of practicing all the embodiments of the present invention. The same reference numerals as in FIG. 19 denote the same parts in FIG. 1, and a description thereof will not be repeated. Note that not all the functional blocks shown in FIG. 1 are indispensable in the individual embodiments. An image capturing apparatus according to an embodiment having functional blocks that are not indispensable may omit the functional blocks that are not indispensable, as a matter of course. All the following embodiments assume a blur correction apparatus used in an image capturing apparatus. A shake detection sensor which detects a shake given to the blur correction apparatus and outputs shake information, for example, an angular velocity sensor 11 according to this embodiment is attached to an image capturing apparatus main body (not shown) to detect a shake given to the apparatus and detect the magnitude of the shake as an angular velocity. A blur correction circuit 19 corrects an image blur caused by the shake given to the apparatus.

The blur correction circuit 19 can be an optical blur correction circuit which corrects a blur of a captured image by driving the correction lens of a correction optical system serving as part of an imaging optical system (lens group) provided in the image capturing apparatus (not shown) in a direction perpendicular to the optical axis and decentering the optical axis in accordance with shake correction data. The blur correction circuit 19 may be an electronic blur correction circuit which corrects a blur by moving a region to be read out from the image sensor of the image capturing apparatus in accordance with shake correction data. Alternatively, the blur correction circuit 19 may be a sensor shift blur correction circuit which moves the image sensor in a plane perpendicular to the optical axis in accordance with shake correction data.

FIG. 1 is different from FIG. 19 in that an offset change circuit 106, signal replacement circuit 107, adder-subtractor 108, and switch 109 are added as functional blocks to be implemented by a microcomputer 120, and the operation of a panning control circuit 112 is changed.

Note that at least one of the functional blocks to be implemented by causing the microcomputer 120 to execute programs stored in a nonvolatile memory (not shown) may be implemented by hardware, as a matter of course.

In accordance with the determination result from the panning control circuit 112, the offset change circuit 106 generates a signal to return shake correction data to the correction center position, and outputs the signal to the adder-subtractor 108. The operation of the offset change circuit 106 will be described later in detail. The adder-subtractor 108 supplies, to the switch 109, a result obtained by applying the offset value output from the offset change circuit 106 to the output signal of an HPF (High-Pass Filter) 15 that cuts off low-frequency components. In this embodiment, the adder-subtractor 108 subtracts the offset value from the output signal of the HPF 15, thereby applying the offset value.

The signal replacement circuit 107 outputs a predetermined signal to the switch 109 in accordance with the determination result from the panning control circuit 112. The operation of the signal replacement circuit 107 will be described later in detail. The switch 109 selectively supplies, to an integrator 16, one of the output of the adder-subtractor 108 and the output of the signal replacement circuit 107 in accordance with the determination result from the panning control circuit 112.

The integrator 16 integrates angular velocity data output from the HPF 15, and supplies the integration result to a focal length calculation circuit as angular displacement data. The DC cut-off frequency of the HPF 15 and the time constant to be used for the integral operation of the integrator 16 are variable under the control of panning control circuit 112.

Based on the angular velocity data output from an A/D converter 14, the angular displacement data output from the integrator 16, and the shake correction data output from a focal length calculation circuit 17, the panning control circuit 112 determines whether the image capturing apparatus is panning. More specifically, the panning control circuit 112 determines whether the movement of the image capturing apparatus is caused by the panning operation of the user. Upon determining that the image capturing apparatus is in the panning state, the panning control circuit 112 performs panning control. In the panning control, the panning control circuit 112 controls the operations of the HPF 15, integrator 16, offset change circuit 106, signal replacement circuit 107, and switch 109.

(First Embodiment)

The operation of a panning control circuit 112 according to the first embodiment of the present invention will be described below. Note that in this embodiment, a signal replacement circuit 107 and a switch 109 are not indispensable, and the output from an adder-subtractor 108 may directly be input to an integrator 16.

FIG. 2A is a flowchart for explaining panning control processing performed by the panning control circuit 112 according to the first embodiment. Note that the processing to be described below with reference to FIG. 2A is repeatedly performed at a predetermined interval, for example, for every vertical sync period (1/60 sec).

In step S101, the panning control circuit 112 computes the value of a variable OFFSET_DATA to be used to decide the output signal of an offset change circuit 106. Note that the output signal of the offset change circuit 106 in the current panning control processing will be defined as OFFSET_NOW, and the output signal of the offset change circuit 106 in the immediately preceding processing (before one vertical sync period) will be defined as OFFSET_PAST.

A method of computing the variable OFFSET_DATA to be used to decide the output signal of the offset change circuit 106 in step S101 will be described with reference to FIG. 3. Referring to FIG. 3, the abscissa represents shake correction data (CORRECT_DATA) that is the output signal of a focal length calculation circuit 17, and the ordinate represents the variable OFFSET_DATA. That is, the panning control circuit 112 computes the value of the variable OFFSET_DATA in accordance with the value of CORRECT_DATA.

When the absolute value of CORRECT_DATA exceeds a panning start determination threshold IN_THRESH1, the panning control circuit 112 determines that the image capturing apparatus is in the panning state. When the absolute value of CORRECT_DATA is lower than a panning end determination threshold OUT_THRESH1 (second threshold), the panning control circuit 112 determines that the image capturing apparatus is not in the panning state. The panning end determination threshold OUT_THRESH1 is smaller than the panning start determination threshold IN_THRESH1.

As shown in FIG. 3, when the absolute value of CORRECT_DATA is equal to or smaller than the panning start determination threshold IN_THRESH1 (first threshold), the panning control circuit 112 sets the value of OFFSET_DATA to zero. On the other hand, if the value of CORRECT_DATA is larger than the panning start determination threshold IN_THRESH1, the panning control circuit 112 computes the value of OFFSET_DATA such that it increases along with an increase in the value of CORRECT_DATA. If the value of CORRECT_DATA is smaller than the panning start determination threshold −IN_THRESH1, the panning control circuit 112 computes the value of OFFSET_DATA such that it decreases along with a decrease in the value of CORRECT_DATA. In this way, the panning control circuit 112 computes the value of OFFSET_DATA such that its absolute value becomes larger as the value of the shake correction data CORRECT_DATA approaches the limit (to be referred to as a correction limit hereinafter) of the operating range of a blur correction circuit 19.

After computing the value of OFFSET_DATA in step S101, the panning control circuit 112 determines in step S102 whether OFFSET_PAST is zero, that is, whether it was determined in the immediately preceding processing that the image capturing apparatus was not in the panning state. If OFFSET_PAST is zero, that is, if it was determined in the immediately preceding processing that the apparatus was not set in the panning state, the panning control circuit 112 advances the process to step S103. Note that the initial value of OFFSET_PAST is zero. Hence, in the first processing, the panning control circuit 112 always executes the process in step S103.

In step S103, the panning control circuit 112 determines whether OFFSET_DATA computed in step S101 is smaller than zero. If OFFSET_DATA is equal to or larger than zero, a sign flag SIGN_FLAG is reset (S104). If OFFSET_DATA is smaller than zero, the sign flag SIGN_FLAG is set (S105). The processing in steps S103 to S105 is performed only when it was determined in the immediately preceding processing that the apparatus was not in the panning state. Once it is determined that the apparatus is in the panning state, the state of the sign flag SIGN_FLAG is maintained until the panning control circuit 112 determines that the apparatus is not in the panning state. After the process in step S104 or S105, the panning control circuit 112 advances the process to step S111.

In step S111, the panning control circuit 112 sets the value of OFFSET_DATA computed in step S101 as the output OFFSET_NOW of the offset change circuit 106. As described with reference to FIG. 3, when the absolute value of CORRECT_DATA exceeds the panning start determination threshold IN_THRESH1, the panning control circuit 112 determines that the image capturing apparatus is in the panning state. At this time, the panning control circuit 112 sets a value that makes the output CORRECT_DATA of the focal length calculation circuit 17 closer to zero (correction center position) as the output OFFSET_NOW of the offset change circuit 106.

If OFFSET_PAST is not zero in step S102, that is, if it was determined in the immediately preceding processing that the image capturing apparatus was in the panning state, the panning control circuit 112 advances the process to step S106. In step S106, the panning control circuit 112 determines whether the sign flag SIGN_FLAG is set, that is, performs panning direction determination.

Upon determining in step S106 that SIGN_FLAG is set, the panning control circuit 112 determines whether OFFSET_ DATA computed in step S101 is smaller than the output OFFSET_PAST of the offset change circuit 106 in the immediately preceding processing (S108). Upon determining in step S106 that SIGN_FLAG is not set, the panning control circuit 112 determines whether OFFSET_DATA computed in step S101 is larger than the output OFFSET_PAST of the offset change circuit 106 in the immediately preceding processing (S107).

That is, in the processing of steps S106 to S108, the panning control circuit 112 determines, if it was determined in the immediately preceding processing that the apparatus was in the panning state, whether the shake correction data CORRECT_DATA approaches the correction limit of the blur correction circuit 19 in the current processing.

Upon determining in step S107 that OFFSET_DATA is larger than OFFSET_PAST, or upon determining in step S108 that OFFSET_DATA is smaller than OFFSET_PAST, the panning control circuit 112 advances the process to step S111. In step S111, the panning control circuit 112 sets the value of OFFSET_DATA computed in step S101 as the output of the offset change circuit 106. That is, if it is already determined that the apparatus is in the panning state, and the value of the shake correction data further approaches the correction limit of the blur correction circuit 19, the panning control circuit 112 controls the output of the offset change circuit 106 to make the shake correction data much closer to zero.

As described above, in this embodiment, if the value of shake correction data approaches the correction limit of the blur correction circuit 19 while the apparatus is determined to be in the offset state, an offset to make the output of an HPF 15 smaller is given. This makes it possible to remove the panning component contained in the angular velocity data output from the HPF 15 without changing the lower cut-off frequency of the HPF 15. Hence, even if the apparatus is determined to be in the panning state, the effect of correcting an image blur generated by a shake of the image capturing apparatus caused by a camera shake or a body shake does not degrade.

Upon determining in step S107 that OFFSET_DATA is equal to or smaller than OFFSET_PAST, or upon determining in step S108 that OFFSET_DATA is equal to or larger than OFFSET_PAST, the panning control circuit 112 advances the process to step S109. That is, if it is already determined that the apparatus is in the panning state, and the value of the shake correction data approaches zero, the panning control circuit 112 advances the process to step S109.

In step S109, the panning control circuit 112 determines whether the absolute value of the shake correction data CORRECT_DATA is smaller than the panning end determination threshold OUT_THRESH1. Upon determining in step S109 that the absolute value of CORRECT_DATA is smaller than OUT_THRESH1, the panning control circuit 112 determines that the panning state has ended, and the process advances to step S111. As shown in FIG. 3, when the absolute value of CORRECT_DATA is smaller than OUT_THRESH1, the panning control circuit 112 decides the value of OFFSET_ DATA as zero. Hence, the value of OFFSET_NOW is set to zero by the process of step S111.

On the other hand, upon determining in step S109 that the absolute value of CORRECT_DATA is equal to or larger than OUT_THRESH1, the panning control circuit 112 sets the output OFFSET_PAST of the offset change circuit 106 in the immediately preceding processing as the output OFFSET_ NOW of the offset change circuit 106 (S110). That is, until it is determined in step S109 that the apparatus is not in the panning state (panning has ended), the output OFFSET_ NOW of the offset change circuit 106 is maintained at the value set in the immediately preceding processing without being updated.

After the process in step S110 or S111, the panning control circuit 112 updates OFFSET_PAST to the value of OFFSET_ NOW (S112) for use in processing of the next cycle. The panning control processing of one cycle thus ends, and processing of the next cycle starts after a predetermined time.

The effectiveness of panning control according to this embodiment will be described with reference to FIGS. 4A to 4C and 5A to 5C. FIGS. 4A to 4C are timing charts showing time-rate changes of shake correction data (CORRECT_ DATA), the lower cut-off frequency of the HPF 15, and the residual shake amount, respectively, when an image capturing apparatus including the conventional blur correction apparatus shown in FIG. 19 performs a panning operation. FIGS. 5A to 5C are timing charts showing time-rate changes of shake correction data (CORRECT_DATA), the output (OFFSET_NOW) of the offset change circuit 106, and the residual shake amount, respectively, when the image capturing apparatus including the blur correction apparatus according to this embodiment performs the same panning operation as in FIGS. 4A to 4C.

FIG. 4A shows the change of shake correction data output from the focal length calculation circuit 17 in FIG. 19 when the panning operation starts at time T1 and ends at time T4. The shake correction data has a waveform obtained by superimposing a low-frequency panning component on a high-frequency camera shake waveform. FIG. 4B shows the time-rate change of the lower cut-off frequency of the HPF 15 when the above-described panning operation is performed. FIG. 4C shows the time-rate change of the difference (residual shake amount) between the actual shake amount and the shake correction data when the above-described panning operation is performed.

FIG. 5A shows the change of shake correction data output from the focal length calculation circuit 17 in FIG. 1 when the panning operation starts at time T1' and ends at time T4'. FIG. 5B shows the time-rate change of output of the offset change circuit 106 when the above-described panning operation is performed. FIG. 5C shows the time-rate change of the difference (residual shake amount) between the actual shake amount and the shake correction data when the above-described panning operation is performed.

In panning control shown in FIGS. 4A to 4C, at time T2 when the magnitude of the shake correction data exceeds IN_THRESH1 in FIG. 4A, the panning control circuit 18 determines that the apparatus is in the panning state. As shown in FIG. 4B, the panning control circuit 18 raises the lower cut-off frequency of the HPF 15 from the time T2. Accordingly, the shake correction data gradually approaches zero from time T3, as shown in FIG. 4A. After that, at the time T4 when the magnitude of the shake correction data falls below OUT_THRESH1 in FIG. 4A, the panning control circuit 18 determines that the panning state has ended. As shown in FIG. 4B, the panning control circuit 18 returns the lower cut-off frequency of the HPF 15 to the lower state at the time T4.

FIG. 4C shows the residual shake amount of the above-described panning control. From the time T2 to T4, the panning component increases the residual shake amount in one direction. Upon determining that the apparatus is in the panning state, the lower cut-off frequency of the HPF 15 is raised to remove the panning component from the shake correction data. However, the frequency band of the panning component is close to that of the shake component, as described above. For this reason, raising the lower cut-off frequency of the HPF 15 leads to attenuation of a shake component to be corrected. As a result, as shown in FIG. 4C, a residual shake amount ERROR_PAN_OLD after removing the panning component in the panning state becomes larger than a residual shake amount ERROR_NORMAL_OLD without panning.

On the other hand, according to this embodiment, at time T2' when the magnitude of the shake correction data exceeds IN_THRESH1 in FIG. 5A, the panning control circuit 112 determines that the image capturing apparatus is in the panning state. As shown in FIG. 5B, the panning control circuit 112 increases the output of the offset change circuit 106 from the time T2' (S111 in FIG. 2A). From the time T2' to T3, when the shake correction data in FIG. 5A becomes larger, the output of the offset change circuit 106 is also made larger. After that, up to the time T4' when the magnitude of the shake correction data falls below OUT_THRESH1 in FIG. 5A, and it is determined that the panning state has ended, the panning control circuit 112 maintains the output of the offset change circuit 106. Accordingly, the shake correction data gradually approaches zero from the time T3', as shown in FIG. 5A. In optical blur correction, the correction lens or image sensor moves toward the center of the optical axis. In electronic blur correction, the read region moves toward the center of the image sensor. As shown in FIG. 5B, the panning control circuit 112 returns the output of the offset change circuit 106 to zero at the time T4'.

FIG. 5C shows the residual shake amount of the panning control according to this embodiment. From the time T2' to T4', the panning component increases the residual shake amount. The output of the offset change circuit 106 is made larger to remove the panning component from the correction data. The output of the offset change circuit 106 maintains a predetermined value from the time T3' to T4'. When the integrator 16 integrates the predetermined value, the value monotonically increases or decreases in one direction. It is therefore possible to smoothly make the shake correction data approach zero without any attenuation of a shake component to be corrected. As a result, as shown in FIG. 5C, a residual shake amount ERROR_PAN_NEW after removing the panning component in the panning state does not change from a residual shake amount ERROR_NORMAL_NEW without panning. That is, the blur correction effect does not degrade even during panning.

As described above, according to this embodiment, when the apparatus is determined to be in the panning state, the output of the HPF 15 is reduced using an offset value, thereby removing the panning component, instead of performing control to raise the lower cut-off frequency of the HPF 15. This allows to suppress the influence of the panning component on the shake correction data without degrading the blur correction effect.

(Second Embodiment)

The second embodiment of the present invention will be described next. This embodiment is characterized in that a panning start determination threshold IN_THRESH1 and a panning end determination threshold OUT_THRESH1, which are fixed in the first embodiment, are changed in accordance with the focal length (angle of view) of a zoom lens with a variable focal length in an image capturing apparatus.

FIG. 6A is a graph showing the relationship between the panning start determination threshold IN_THRESH1 and the focal length of the zoom lens according to this embodiment. As shown in FIG. 6A, a panning control circuit 112 of this embodiment sets the panning start determination threshold IN_THRESH1 to be smaller as the focal length of the zoom lens increases (the angle of view decreases).

Letting θ be angular displacement data output from an integrator 16, and f be the focal length data of the zoom lens, shake correction data CORRECT_DATA output from a focal length calculation circuit 17 is given by CORRECT_DATA=f tan θ. When a blur of predetermined angular velocity occurs in a blur correction apparatus 100, the change amount of the shake correction data increases along with an increase in the focal length of the zoom lens. If panning is performed when the focal length of the lens is large, the shake correction data more quickly approaches the correction limit as compared to when the focal length is small. That is, it is easier to reach the correction limit of a blur correction circuit 19. To cope with this, in this embodiment, the panning start determination threshold IN_THRESH1 is made smaller as the focal length of the lens increases, as shown in FIG. 6A, so as to determine that the apparatus is in the panning state at an earlier timing. This allows to suppress degradation of the blur correction effect during the panning operation in the telephoto mode.

FIG. 6B shows the relationship between the panning end determination threshold OUT_THRESH1 and the focal length of the lens according to this embodiment. As shown in FIG. 6B, the panning control circuit 112 of this embodiment sets the panning end determination threshold OUT_THRESH1 to be larger as the focal length of the lens increases (the angle of view decreases).

As described above, when a shake of predetermined angular velocity occurs in the blur correction apparatus 100, the change amount of the shake correction data increases along with an increase in the focal length of the zoom lens. If the value of the output of an offset change circuit 106 does not change, the speed at which the shake correction data approaches zero also increases along with an increase in the focal length of the lens. Hence, if panning end determination delays when the focal length of the lens is large, the shake correction data may approach the correction limit on the opposite side across zero. To prevent this, the panning end determination threshold OUT_THRESH1 is made larger as the focal length of the lens increases, as shown in FIG. 6B, so as to do panning end determination at an earlier timing. This allows to prevent the shake correction data from approaching the correction limit on the opposite side.

As described above, according to this embodiment, it is possible to implement the same effect as in the first embodiment even when the focal length of the lens is changed.

(Third Embodiment)

The third embodiment of the present invention will be described next. This embodiment is characterized in that the absolute value of correction data is smaller than a panning end determination threshold OUT_THRESH1, and a panning state is determined to have ended when the absolute value of angular velocity data (GYRO_DATA) satisfies a condition. Note that in this embodiment, a signal replacement circuit 107 and a switch 109 are not indispensable, and the output from an adder-subtractor 108 may directly be input to an integrator 16.

Figure 2B:
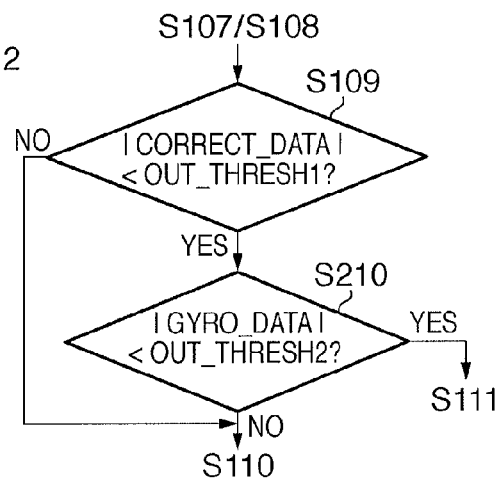
FIG. 2B is a flowchart for explaining, out of panning control processing performed by a panning control circuit 112 according to the third embodiment of the present invention, a processing step different from the first embodiment.

FIG. 2B is a flowchart for explaining, out of panning control processing performed by a panning control circuit 112 according to the third embodiment, operations different from the first embodiment. The panning control processing of the third embodiment is the same as that of the first embodiment except that angular velocity data determination processing (S210) is added between steps S109 and S111. Only the different processing will be described.

In step S109, the panning control circuit 112 determines whether the absolute value of shake correction data CORRECT_DATA is smaller than the panning end determination threshold OUT_THRESH1. Upon determining in step S109 that the absolute value of CORRECT_DATA is equal to or larger than OUT_THRESH1, the panning control circuit 112 sets an output OFFSET_PAST of an offset change circuit 106 in the immediately preceding processing as an output OFFSET_NOW of the offset change circuit 106 (S110).

On the other hand, upon determining in step S109 that the absolute value of CORRECT_DATA is smaller than OUT_THRESH1, the panning control circuit 112 advances the process to step S210. In step S210, the panning control circuit 112 determines whether the absolute value of angular velocity data (GYRO_DATA) output from an A/D converter 14 is smaller than a panning end determination angular velocity threshold OUT_THRESH2. The panning end determination angular velocity threshold OUT_THRESH2 corresponds to a third threshold.

Upon determining in step S210 that the absolute value of GYRO_DATA is smaller than the panning end determination angular velocity threshold OUT_THRESH2, the panning control circuit 112 determines that the panning state has ended, and the process advances to step S111.

The technical meaning of the process in step S210 will be described next in detail with reference to FIGS. 7A to 7D.

FIGS. 7A to 7C show time-rate changes of the angular velocity data (GYRO_DATA), shake correction data (CORRECT_DATA), and the output (OFFSET_NOW) of the offset change circuit 106, respectively, at the end of the panning operation (near time T4' in FIGS. 5A to 5C). FIG. 7D shows a time-rate change of a value obtained by removing a panning component that need not be corrected from the difference (residual shake amount) between the actual shake amount at the end of the panning operation and the shake correction data output from a focal length calculation circuit 17.

As in the first embodiment, if the panning state should be determined to have ended at the timing the absolute value of the shake correction data falls below OUT_THRESH1, the panning is determined to have ended at time T11 in FIGS. 7A to 7D. Then, the output of the offset change circuit 106 is returned to zero (S111).

At this time, if the absolute value of the angular velocity data is large (equal to or larger than OUT_THRESH2), that is, the shake speed is high, as shown in FIG. 7A, the following phenomenon occurs. At the time T11 when the shake speed is high, the residual shake amount becomes large, as shown in FIG. 7D, due to the influence of the detection error of an angular velocity sensor 11 and other calculation errors. When the output of the offset change circuit 106 is returned to zero at such a timing with a large residual shake amount, the residual shake amount further increases due to the influence of the change of the output of the offset change circuit 106.

To prevent this, in this embodiment, when the absolute value of the shake correction data falls below OUT_THRESH1, and the absolute value of the angular velocity data falls below the panning end determination angular velocity threshold OUT_THRESH2, the panning state is determined to have ended.

The absolute value of the angular velocity data shown in FIG. 7A falls below the panning end determination angular velocity threshold OUT_THRESH2 at time T12. At the time T12, the absolute value of the angular velocity data in FIG. 7A is small, that is, the shake speed is low. At the time T12 when the shake speed is low, the residual shake amount is also small, as shown in FIG. 7D. When the offset value OFFSET_NOW is returned to zero (S111) at the timing with the small residual shake amount, the influence of the change of the offset value on the residual shake amount can sufficiently be suppressed as compared to the case in which the offset value is returned at the timing with a large residual shake amount.

As described above, according to this embodiment, panning component removal is ended when not only the absolute value of the shake correction data but also the angular velocity data is small. This allows to sufficiently suppress the influence of the end of panning component removal on the residual shake amount.

(Fourth Embodiment)

The fourth embodiment of the present invention will be described next. This embodiment is characterized in that the value of a panning end determination angular velocity threshold OUT_THRESH2, which is fixed in the third embodiment, is changed in accordance with the focal length (angle of view) of a zoom lens with a variable focal length in an image capturing apparatus.

FIG. 6C shows the relationship between the panning end determination angular velocity threshold OUT_THRESH2 and the focal length of the lens according to this embodiment. As shown in FIG. 6C, a panning control circuit 112 of this embodiment sets the panning end determination angular velocity threshold OUT_THRESH2 to be larger as the focal length of the lens increases (the angle of view decreases).

As described above, when a blur of predetermined angular velocity occurs in a blur correction apparatus 100, the change amount of the shake correction data increases along with an increase in the focal length of the lens. In addition, if the value of the output of an offset change circuit 106 does not change, the speed at which the shake correction data approaches zero also increases along with an increase in the focal length of the lens. Hence, if panning end determination delays when the focal length of the lens is large, the shake correction data may approach the correction limit on the opposite side across zero. To prevent this, the value of the panning end determination angular velocity threshold OUT_THRESH2 is made larger as the focal length of the lens increases, as shown in FIG. 6C, so as to do panning end determination at an earlier timing. This allows to prevent the shake correction data from approaching the correction limit on the opposite side.

As described above, according to this embodiment, it is possible to implement the same effect as in the third embodiment even when the focal length of the lens is changed.

(Fifth Embodiment)

The fifth embodiment of the present invention will be described next. This embodiment relates to a panning control method when zooming is being performed. In this embodiment, a signal replacement circuit 107 and a switch 109 in FIG. 1 are not indispensable.

FIG. 8 is a flowchart for explaining panning control processing performed by a panning control circuit 112 according to this embodiment. Note that the processing to be described below with reference to FIG. 8 is repeatedly performed at a predetermined interval, for example, for every vertical sync period (1/60 sec).

In step S301, the panning control circuit 112 acquires the focal length of the lens via a focal length calculation circuit 17, and determines whether it has increased from the focal length acquired in the immediately preceding processing (changed from the wide side to the telephoto side). Upon determining in step S301 that the focal length has not increased, the panning control circuit 112 advances the process to step S302.

The output signal of an offset change circuit 106 when the zooming operation is being performed will be defined as OFFSET_ZOOM. In step S302, the panning control circuit 112 sets the value of OFFSET_ZOOM to zero, and ends the processing. If this embodiment is to be practiced with at least one of the first to fourth embodiments, the offset change circuit 106 outputs a value corresponding to the sum of OFFSET_NOW and OFFSET_ZOOM. If this embodiment is to be practiced solely, the offset change circuit 106 outputs OFFSET_ZOOM.

Upon determining in step S301 that the focal length has increased, the panning control circuit 112 advances the process to step S303. In step S303, the panning control circuit 112 computes the value of OFFSET_ZOOM as shown in FIGS. 9A to 9D.

In this embodiment, the panning control circuit 112 decides the value of OFFSET_ZOOM in accordance with the zoom speed (focal length increasing speed), the focal length, and the value of shake correction data. The parameter to be decided in accordance with the zoom speed will be defined as ZOOM_OFFSET_SPEED, the parameter to be decided in accordance with the focal length will be defined as FOCAL_OFFSET_GAIN, and the parameter to be decided in accordance with the shake correction data will be defined as CORRECT_OFFSET_GAIN. At this time, the panning control circuit 112 computes the value of OFFSET_ZOOM by $$OFFSET\_ZOOM = ZOOM\_OFFSET\_SPEED \times FOCAL\_OFFSET\_GAIN \times CORRECT\_OFFSET\_GAIN \quad (1)$$

FIG. 9A is a graph showing the relationship between the zoom speed and ZOOM_OFFSET_SPEED. When the zoom speed is equal to or less than a zoom speed threshold SPEED_THRESH that is a fourth threshold, the value of ZOOM_OFFSET_SPEED is zero. When the zoom speed is more than SPEED_THRESH, the value of ZOOM_OFFSET_SPEED is increased along with an increase in the zoom speed. If the speed at which the focal length increases rises, the speed at which the shake correction data approaches zero also increases. It is therefore necessary to increase the speed at which the shake correction data approaches zero.

FIG. 9B is a graph showing the relationship between the focal length and FOCAL_OFFSET_GAIN. FOCAL_OFFSET_GAIN is a coefficient that multiplies ZOOM_OFFSET_SPEED. FOCAL_OFFSET_GAIN decreases as the focal length increases. If the value of the output of the offset change circuit 106 does not change, the speed at which the shake correction data approaches zero also increases along with an increase in the focal length. For this reason, the speed at which the shake correction data approaches zero abruptly rises during zooming, resulting in unnatural movement. If the output of the offset change circuit 106 is decreased as the focal length increases, as shown in FIG. 9B, the speed at which the shake correction data approaches zero can be kept constant even during zooming. This allows to prevent any unnatural movement.

FIG. 9C is a graph showing the relationship between the shake correction data CORRECT_DATA and CORRECT_OFFSET_GAIN. CORRECT_OFFSET_GAIN is a coefficient that multiplies ZOOM_OFFSET_SPEED, like FOCAL_OFFSET_GAIN. CORRECT_OFFSET_GAIN increases as the value of shake correction data increases. The reason is as follows. If the shake correction data is close to the correction limit, it is necessary to more quickly make the shake correction data approach zero to prevent it from reaching the correction limit. Note that if the shake correction data is zero, the value of CORRECT_OFFSET_GAIN is also zero.

Hence, the value of OFFSET_ZOOM is zero when the zoom speed is equal to or less than the zoom speed threshold SPEED_THRESH. If the zoom speed is more than the zoom speed threshold, the value of OFFSET_ZOOM becomes larger as the zoom speed increases, the focal length decreases, and the value of shake correction data increases. The panning control circuit 112 gives the value of OFFSET_ZOOM to the offset change circuit 106.

After computing the value of OFFSET_ZOOM in step S303, the panning control circuit 112 advances the process to step S304. In step S304, the panning control circuit 112 determines whether the current focal length acquired in step S301 is larger than a focal length threshold ZOOM_THRESH. If the focal length is larger than ZOOM_THRESH, the process advances to step S305.

In step S305, the panning control circuit 112 sets the lower cut-off frequency of an HPF 15. In step S305, the panning control circuit 112 computes the lower cut-off frequency of the HPF 15 as shown in FIG. 9D.

That is, when the focal length is larger than ZOOM_THRESH that is a fifth threshold, the panning control circuit 112 computes the lower cut-off frequency of the HPF 15 such that it increases along with an increase in the focal length.

On the other hand, if the focal length is equal to or smaller than ZOOM_THRESH in step S304, the panning control circuit 112 ends the processing, and waits for the next processing start period.

The effectiveness of panning control when the zooming operation is performed according to this embodiment will be described next with reference to FIGS. 10A to 10C and 11A to 11D. FIGS. 10A to 10C are timing charts showing time-rate changes of angular velocity data, shake correction data, and the lower cut-off frequency of the HPF 15, respectively, when the image capturing apparatus including the conventional blur correction apparatus performs a panning operation during high-speed zooming.

FIGS. 11A to 11D are timing charts showing time-rate changes of angular velocity data, shake correction data, the output (OFFSET_ZOOM) offset change circuit 106, and the lower cut-off frequency of the HPF 15, respectively, when an image capturing apparatus including a blur correction apparatus according to this embodiment performs the same operation as in FIGS. 10A to 10C.

FIG. 10A shows the change of angular velocity data output from an A/D converter 14 in FIG. 19. FIG. 10A shows the time-rate change of angular velocity data when the zooming operation (zoom-in operation) and the panning operation start simultaneously at time T21, the zooming operation ends at time T22, and the panning operation ends at time T23. FIG. 10B shows the change of shake correction data output from a focal length calculation circuit 17 in FIG. 19. The solid line indicates shake correction data when conventional panning control is performed. The dotted line indicates shake correction data when conventional panning control is not performed. FIG. 10C shows the time-rate change of the lower cut-off frequency of the HPF 15 when conventional panning control is performed.

Figure 11A:
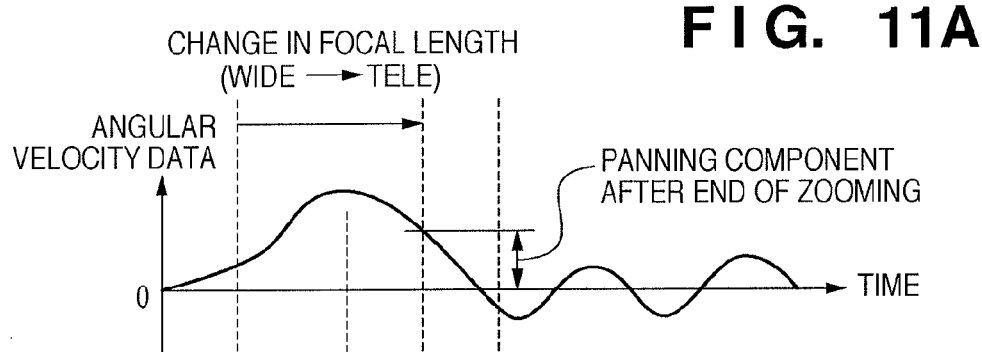

FIG. 11A shows the time-rate change of GYRO_DATA (angular velocity data) output from an A/D converter 14 in FIG. 1 when the same zooming operation and panning operation as in FIG. 10A are performed. In FIGS. 11A to 11D, the zooming operation (zoom-in operation) and the panning operation start simultaneously at time T31, the zooming operation ends at time T33, and the panning operation ends at time T34.

Figure 11B:
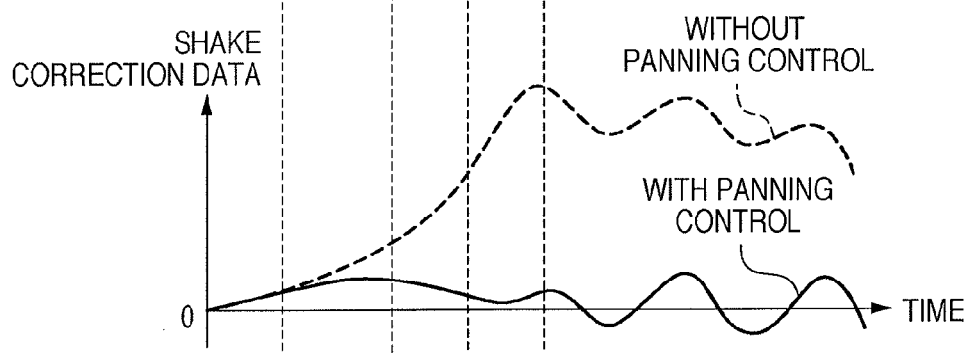
Figure 11C:
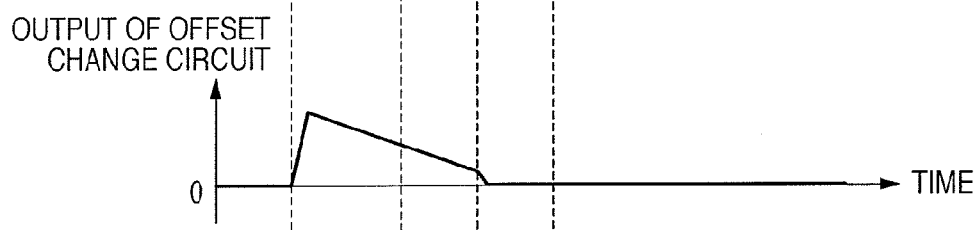
Figure 11D:
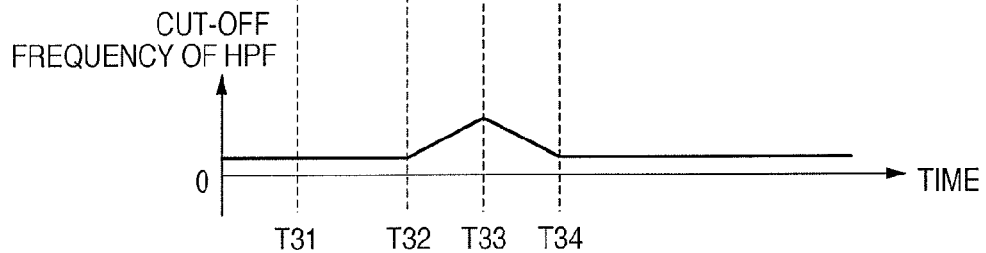

FIG. 11B shows the time-rate change of shake correction data output from the focal length calculation circuit 17 in FIG. 1. The solid line in FIG. 11B indicates shake correction data when panning control of this embodiment is performed. The dotted line indicates shake correction data when panning control of this embodiment is not performed. FIG. 11C shows the time-rate change of the output of the offset change circuit 106 when the above-described zooming operation and panning operation are performed. FIG. 11D shows the time-rate change of the lower cut-off frequency of the HPF 15 according to the panning control of this embodiment.

The shake correction data for use in the correction of a shake of predetermined angular velocity data becomes larger in proportion to the focal length. For this reason, as shown in FIGS. 10A and 11A, when the panning operation and the high-speed zooming (zoom-in) operation are simultaneously performed, the shake correction data quickly becomes large as the focal position approaches the TELE side, as indicated by the dotted lines in FIGS. 10B and 11B.

The conventional panning control is performed in the following way to prevent the shake correction data from quickly approaching the correction limit of the blur correction circuit 19. As shown in FIG. 10C, the lower cut-off frequency of the HPF 15 is increased as the focal length increases between the times T21 and T22 where the high-speed zooming operation is being performed. This prevents any abrupt increase of shake correction data, as indicated by the solid line in FIG. 10B.

However, the conventional panning control has the following problem. If the lower cut-off frequency of the HPF 15 is quickly returned to the original value after the end of the zooming operation at the time T22, the shake correction data abruptly changes, and its error amount abruptly becomes large. To prevent this, the lower cut-off frequency needs to be lowered slowly from the time T22 to T24. However, when the lower cut-off frequency of the HPF 15 is high, the HPF 15 attenuates a shake component to be corrected, too. That is, the attenuation of the shake component does not return to the original state until the lower cut-off frequency returns to the original value after the end of the zooming operation (from the time T22 to T24), resulting in a large residual shake amount.

On the other hand, in the panning control of this embodiment, the output of the offset change circuit 106 is decided in accordance with OFFSET_ZOOM computed by equation (1) from the time T31 to T33 where the zooming operation is being performed, as shown in FIG. 11C. In addition, the lower cut-off frequency of the HPF 15 is not raised until the focal length reaches ZOOM_THRESH, thereby minimizing the period where the shake component is attenuated, as will be described below.

Assume that the focal length reaches ZOOM_THRESH at the time T32 in FIGS. 11A to 11D during the zooming operation. In this case, as shown in FIG. 11D, the panning control circuit 112 increases the lower cut-off frequency of the HPF 15 as shown in FIG. 9D from the time T32 until the zooming operation ends at the time T33. After the end of the zooming operation, the lower cut-off frequency of the HPF 15 is gradually returned to the small value (the value before the change) up to the time T34, as shown in FIG. 11D. From the time T34, the lower cut-off frequency of the HPF 15 has the original value. In the conventional panning control, the state in which the attenuation of the shake component is large continues for a long time from the time T21 to T24. In this embodiment, however, the shake component is attenuated for a short time from T32 to T34. Additionally, the attenuation of the shake component can be small. For these reasons, the absolute residual shake amount is small, and the shake component can return to the original state in a short time.

The reason why control is performed to increase the lower cut-off frequency of the HPF 15 will be explained here. As shown in FIG. 11C, from the time T31 to T33 where the zooming operation is being performed, control is performed to increase the output of the offset change circuit 106 so as to increase the speed at which the shake correction data approaches zero. However, if panning has not ended yet even after the end of the zooming operation at the time T33, as shown in FIG. 11A, the output of the offset change circuit 106 is zero. For this reason, due to the panning component after the end of the zooming operation, the shake correction data quickly approaches the correction limit especially when the focal length is large. In this embodiment, as shown in FIG. 11D, the lower cut-off frequency of the HPF 15 is increased when the focal length increases during the zooming operation. This makes it possible to remove the panning component immediately after the end of the zooming operation and prevent the phenomenon that the shake correction data quickly approaches the correction limit.

Note that if the panning operation continues even past the time T34, the processing shown in the flowchart of FIG. 2A or 2B is performed while returning the lower cut-off frequency of the HPF 15 from the time T33 to T34. This allows to prevent the phenomenon that the shake correction data quickly approaches the correction limit even after the time T34 where the lower cut-off frequency is low.

As described above, according to this embodiment, in panning control during the zooming operation, both the output change control of the offset change circuit 106 and the lower cut-off frequency change control of the HPF 15 are adopted. This allows to minimize the time when the lower cut-off frequency is high, that is, the time when the residual shake amount is large.

As described above, according to the panning control method of this embodiment, when the zooming operation is performed during panning, and the zoom speed is equal to or larger than the threshold, correction is executed to increase the offset value for reducing the output of the HPF 15. Hence, in addition to the effect of the above-described embodiments, it is possible to prevent the residual shake amount from increasing even when the high-speed zooming operation is performed during panning. In addition, from the timing at which the focal length of the lens exceeds a predetermined value, control for raising the cut-off frequency of the HPF 15 is executed together. Hence, the time required to return the cut-off frequency of the HPF 15 to the original value after the end of zooming is short. It is therefore possible to appropriately remove the panning component while minimizing the increase in the residual shake amount caused by raising the cut-off frequency of the HPF 15.

(Sixth Embodiment)

The sixth embodiment of the present invention will be described next. This embodiment relates to a panning control method upon abrupt panning.

FIG. 12A is a flowchart for explaining panning control processing performed by a panning control circuit 112 according to this embodiment. Note that the processing to be described below with reference to FIG. 12A is repeatedly performed at a predetermined interval of, for example, 1/60 sec.

In step S401, the panning control circuit 112 determines whether a flag CHANGE_FLAG is set. This flag is set in step S408 and reset in step S412. If CHANGE_FLAG is reset, the panning control circuit 112 advances the process to step S402.

Let INT_DATA be angular displacement data that is the output signal of an integrator 16, and INT_INCREASE_WIDTH be the change width of monotonically increasing or decreasing INT_DATA. In step S402, the panning control circuit 112 determines whether INT_INCREASE_WIDTH is larger than a panning start determination integrator threshold IN_THRESH2 (sixth threshold). If INT_INCREASE_WIDTH is larger than IN_THRESH2, the panning control circuit 112 advances the process to step S403.

In step S403, the panning control circuit 112 determines whether the absolute value of angular velocity data GYRO_DATA output from an A/D converter 14 is larger than a panning start determination angular velocity threshold IN_THRESH3 (seventh threshold). Upon determining that the absolute value of GYRO_DATA is larger than IN_THRESH3, the panning control circuit 112 determines that the image capturing apparatus is in the panning state, and the process advances to step S404. On the other hand, upon determining in step S402 that INT_INCREASE_WIDTH is equal to or smaller than IN_THRESH2, the panning control circuit 112 determines that the image capturing apparatus is not in the panning state. Also upon determining in step S403 that the absolute value of GYRO_DATA is equal to or smaller than IN_THRESH3, the panning control circuit 112 determines that the image capturing apparatus is not in the panning state. If it is determined that the image capturing apparatus is not in the panning state, the panning control circuit 112 ends the processing, and waits for the start of next processing. Note that the determination order of steps S402 and S403 may be reversed.

In step S404, the panning control circuit 112 determines whether the angular velocity data GYRO_DATA output from the A/D converter 14 is smaller than zero. If GYRO_DATA is equal to or larger than zero, the panning control circuit 112 advances the process to step S405 to reset a sign flag SIGN_FLAG2. If GYRO_DATA is smaller than zero, the panning control circuit 112 advances the process to step S406 to set the sign flag SIGN_FLAG2. After the process in step S405 or S406 is performed, the panning control circuit 112 advances the process to step S407.

In step S407, the panning control circuit 112 computes the value of replacement signal data GYRO_DUMMY to be output from a signal replacement circuit 107 in FIG. 1 in accordance with the angular displacement data INT_DATA that is the output signal of the integrator 16, as shown in FIG. 13. More specifically, if the absolute value of INT_DATA is equal to or smaller than INT_THRESH (equal to or smaller than an eighth threshold), the value of GYRO_DUMMY is set to zero. If the value of INT_DATA is larger than INT_THRESH, the value of GYRO_DUMMY is computed such that it becomes smaller as a negative value as the value of INT_DATA increases. If the value of INT_DATA is larger than a threshold −INT_THRESH, the value of GYRO_DUMMY is computed such that it becomes larger as a positive value as the value of INT_DATA decreases.

After computing GYRO_DUMMY in step S407, the panning control circuit 112 advances the process to step S408. In step S408, the panning control circuit 112 changes the state of a switch 109 from a state in which the output of an HPF 15 is connected to the integrator 16 to a state in which the output of a signal replacement circuit 107 is connected to the integrator 16, and sets the flag CHANGE_FLAG. When the panning control circuit 112 changes the state of the switch 109 in step S408, GYRO_DUMMY output from the signal replacement circuit 107, which is computed in step S407, is input to the integrator 16. As shown in FIG. 13, GYRO_DUMMY increases as the absolute value of INT_DATA output from the integrator 16 increases, and has a sign opposite to that of INT_DATA. Hence, INT_DATA output from the integrator 16 changes so as to approach zero.

When the process in step S408 has ended, the panning control circuit 112 ends the processing, and waits for the start of next processing.

On the other hand, upon determining in step S401 that CHANGE_FLAG is set, that is, the switch 109 is connected to give the output of the signal replacement circuit 107 to the integrator 16, the panning control circuit 112 advances the process to step S409. In step S409, the panning control circuit 112 determines whether SIGN_FLAG2 is set, that is, whether the angular velocity data upon panning start determination is negative or positive (equal to or larger than zero).

Upon determining in step S409 that SIGN_FLAG2 is reset, that is, if the angular velocity data upon panning start determination is positive, the panning control circuit 112 advances the process to step S410. In step S410, the panning control circuit 112 determines whether GYRO_DATA is smaller than a panning end determination angular velocity threshold OUT_THRESH3. Note that OUT_THRESH3 is smaller than the panning start determination angular velocity threshold IN_THRESH3.

Upon determining in step S409 that SIGN_FLAG2 is set, that is, if the angular velocity data upon panning start determination is negative, the panning control circuit 112 advances the process to step S411. In step S411, the panning control circuit 112 determines whether GYRO_DATA is larger than −OUT_THRESH3.

Upon determining in step S410 that GYRO_DATA is smaller than OUT_THRESH3, or upon determining in step S411 that GYRO_DATA is larger than −OUT_THRESH3, the panning control circuit 112 determines that the panning state has ended, and the process advances to step S412. In step S412, the panning control circuit 112 changes the state of the switch 109 from the state in which the output of the signal replacement circuit 107 is connected to the integrator 16 to the state in which the output of the HPF 15 is connected to the integrator 16, and resets the flag CHANGE_FLAG. After the end of the process in step S412, the panning control circuit 112 ends the processing, and waits for the next processing execution period.

Upon determining in step S410 that GYRO_DATA is equal to or larger than OUT_THRESH3, or upon determining in step S411 that GYRO_DATA is equal to or smaller than −OUT_THRESH3, the panning control circuit 112 determines that the panning state continues, and the process advances to step S413.

In step S413, the panning control circuit 112 determines whether the absolute value of the angular displacement data (INT_DATA) that is the output signal of the integrator 16 is smaller than a threshold OUT_THRESH4. Upon determining in step S413 that the absolute value of INT_DATA is smaller than the threshold OUT_THRESH4, the panning control circuit 112 advances the process to step S414. Note that OUT_THRESH4 is smaller than INT_THRESH, as shown in FIG. 13.

In step S414, the panning control circuit 112 determines that the angular displacement data INT_DATA has sufficiently approached zero, and sets the value of GYRO_DUMMY to zero. This prevents the angular displacement data from moving toward the correction limit on the opposite side across the center.

Upon determining in step S413 that the absolute value of INT_DATA is equal to or larger than the threshold OUT_THRESH4, the panning control circuit 112 ends the processing, and waits for the next processing execution period.

As described above, according to this embodiment, when the change amount of the monotonically increasing or decreasing angular displacement data output from the integrator 16 exceeds the threshold, and the absolute value of the angular velocity data exceeds the threshold, a value for reducing the angular displacement data is given to the integrator 16 in place of the output of the HPF 15. In this case, correction data hardly reaches the correction limit even in abrupt panning.

The effectiveness of panning control according to this embodiment will be described next with reference to FIGS. 14A to 14E.

FIGS. 14A to 14C show time-rate changes of the angular velocity data GYRO_DATA, the lower cut-off frequency of the HPF 15, and the angular displacement data INT_DATA, respectively, when the image capturing apparatus including the conventional blur correction apparatus performs an abrupt panning operation. FIGS. 14D and 14E are timing charts showing time-rate changes of the output signal (GYRO_DUMMY) of the signal replacement circuit 107 and angular displacement data, respectively, when an image capturing apparatus including a blur correction apparatus according to this embodiment performs the same panning operation.

FIG. 14A shows the time-rate change of angular velocity data output from the A/D converter 14 in FIG. 19 or FIG. 1.

Assume that an abrupt panning operation starts at time 0 and ends at time T53. FIG. 14B shows the time-rate change of the lower cut-off frequency of the HPF 15 when the abrupt panning operation is performed. FIG. 14C shows the time-rate change of the angular displacement data output from the integrator 16 in FIG. 19. The solid line indicates angular displacement data when conventional panning control is performed. The dotted line indicates angular displacement data when conventional panning control is not performed.

FIG. 14D is a timing chart showing the time-rate change of replacement signal data output from the signal replacement circuit 107 when the abrupt panning operation is performed. FIG. 14E is a timing chart showing the time-rate change of the angular displacement data output from the integrator 16 in FIG. 1. The solid line in FIG. 14E indicates the time-rate change when panning control of this embodiment is performed. The dotted line indicates the time-rate change when panning control of this embodiment is not performed.

As shown in FIG. 14A, when a panning operation that increases the angular velocity data in a short time is performed, the value of the angular displacement data quickly increases without panning control, as indicated by the dotted lines in FIGS. 14C and 14E, and approaches the correction limit of a blur correction circuit 19.

To prevent a phenomenon that the angular displacement data quickly approaches the correction limit, the conventional panning control is performed to raise the lower cut-off frequency of the HPF 15 from the time T51 when the angular velocity data exceeds the panning start determination angular velocity threshold IN_THRESH3, as shown in FIG. 14B. This prevents the phenomenon that the angular displacement data quickly increases and approaches the correction limit, as indicated by the solid line in FIG. 14C.

However, the conventional panning control has the following problem. At the time T53, the angular velocity data falls below the panning end determination angular velocity threshold OUT_THRESH3 so that it is determined that the panning operation has ended. If the lower cut-off frequency of the HPF 15 is quickly returned to the original value after that, the shake correction data abruptly changes, and its error amount abruptly becomes large. To prevent this, the lower cut-off frequency needs to be lowered slowly from the time T53 to T54. However, when the lower cut-off frequency of the HPF 15 is high, a shake component to be corrected is also attenuated. That is, the attenuation of the shake component does not return to the original state until the lower cut-off frequency returns to the original value after the end of the abrupt zooming operation (from the time T53 to T54), resulting in a large residual shake amount.

On the other hand, the panning control circuit 112 according to this embodiment does not determine that the panning operation has started when the angular velocity data only exceeds the panning start determination angular velocity threshold IN_THRESH3 at the time T51, as indicated by steps S402 and S403 in FIG. 12A. The panning control circuit 112 determines that the panning operation has started when the angular displacement data monotonically increases or decreases, and its change amount exceeds the panning start determination integrator threshold IN_THRESH2 at the time T52.

Upon determining that the panning operation has started at the time T52, the panning control circuit 112 decides GYRO_DUMMY output from the signal replacement circuit 107, as shown in FIG. 13 (FIG. 14D). The panning control circuit 112 changes the state of the switch 109 to start supply the output of the signal replacement circuit 107 to the integrator 16 in place of the output of the HPF 15. Upon determining at the time T53 that the panning operation has ended, the panning control circuit 112 returns the switch 109 to the original state so as to supply the output of the HPF 15 to the integrator 16.

While the switch 109 is changed to the state in which the replacement signal data output from the signal replacement circuit 107 is supplied to the integrator 16 from the time T52 to T53, the angular displacement data output from the integrator 16 approaches zero, as shown in FIG. 14E. As shown in FIG. 13, the panning control circuit 112 computes the replacement signal data GYRO_DUMMY whose sign is opposite to that of the displacement data and whose absolute value increases as the absolute value of the angular displacement data increases. With this processing, when the angular displacement data is close to the correction limit, a large value is reduced from the angular displacement data. This allows to make the shake correction data approach zero more quickly.

Note that from the time T52 to T53, since the angular velocity data is switched to the output of the signal replacement circuit 107, no blur correction can be done. Since the panning operation is intentionally performed by the user, a natural image can be obtained without correction. However, if panning control carelessly starts, a state with blur correction and a state without blur correction are repeated, resulting in an awkward image. Hence, panning start determination is done based on two conditions in steps S402 and S403 of the flowchart in FIG. 12A, thereby preventing panning control from carelessly starting.

When the panning control of this embodiment is performed, the angular displacement data changes as indicated by the solid line in FIG. 14E. Hence, the phenomenon that the angular displacement data quickly approaches the correction limit can be prevented. It is also possible to prevent the phenomenon that the residual shake amount becomes large because of the lower cut-off frequency change control of the HPF 15 from the time T53 to T54 in FIG. 14B, and perform control to minimize the residual shake amount immediately after the end of the panning operation.

As described above, according to this embodiment, when an abrupt panning operation is performed, replacement signal data is supplied to the integrator in place of angular velocity data, thereby preventing the angular displacement data output from the integrator from reaching the correction limit. When the panning operation has ended, blur correction capable of implementing a sufficient effect can immediately start. This makes it possible to avoid the phenomenon that the residual shake amount becomes large for awhile after the end of panning as in the conventional panning control which raises the lower cut-off frequency of the HPF 15 during the panning operation.

Note that in this embodiment, panning determination is done based on the angular displacement data output from the integrator 16. However, the present invention is not limited to this. For example, the determination may be done using shake correction data output from the focal length calculation circuit 17. Alternatively, an integrator dedicated to panning determination may be prepared so that the determination is done using its output.

(Seventh Embodiment)

The seventh embodiment of the present invention will be described next. This embodiment relates to a panning control method upon abrupt panning, like the sixth embodiment. Panning control processing of the seventh embodiment is characterized by performing the process in step S502 of FIG. 12B in place of the process in step S402 of the sixth embodiment shown in FIG. 12A. The remaining processing steps are the same as in the sixth embodiment. Hence, only the process of step S502 that is a characteristic feature of this embodiment will be described, and a description of the other processes will be omitted.

In step S402 of FIG. 12A, when the absolute value of angular velocity data exceeds IN_THRESH3, and the change width of monotonically increasing or decreasing angular displacement data output from the integrator 16 exceeds the threshold IN_THRESH2, the panning control circuit determines that the panning operation has started. In this method, however, if the angular displacement data changes to exhibit an instantaneous decrease and then immediately increases, the angular displacement data may reach the correction limit before the change width of the monotonical increasing (decreasing) angular displacement data exceeds IN_THRESH2.

In this embodiment, the panning control circuit determines whether the absolute value of angular displacement data output from an integrator 16 is larger than a panning start determination angular displacement threshold IN_THRESH4, as indicated by step S502 of FIG. 12B. Note that IN_THRESH4 as a ninth threshold is set to a value closer to the correction limit than OUT_THRESH4 and INT_THRESH, as shown in FIG. 13. That is, a panning control circuit 112 of this embodiment determines that the panning operation has started when the absolute value of the angular velocity data exceeds a seventh threshold IN_THRESH3, and the absolute value of the angular displacement data that is the output signal of the integrator 16 exceeds the ninth threshold IN_THRESH4. This makes it possible to perform panning start determination before the angular displacement data reaches the correction limit, and thus prevent the angular displacement data from reaching the correction limit.

As described above, according to this embodiment, it is possible to implement the same effect as in the sixth embodiment even when the angular displacement data change direction by the panning operation is not constant.

(Eighth Embodiment)

The eighth embodiment of the present invention will be described next. This embodiment relates to a panning control method in consideration of swing-back of a panning operation.

FIG. 15 is a flowchart for explaining panning control processing performed by a panning control circuit 112 according to this embodiment. Note that the processing to be described below with reference to FIG. 15 is repeatedly performed at a predetermined interval of, for example, 1/60 sec.

FIG. 16A is a timing chart showing a time-rate change of the output (angular velocity data) of an A/D converter 14 when a panning operation is performed. Referring to FIG. 16A, during the period of the panning operation, a DC cut filter 12 attenuates the low-frequency component of panning so that the angular velocity data gradually decreases. When the panning operation has ended, the angular velocity data swings in a direction opposite to the panning direction because of the influence of the panning low-frequency component attenuated by the DC cut filter 12. After that, the angular velocity data converges to zero in a time corresponding to the time constant of the DC cut filter 12. The flowchart of FIG. 15 shows processing of preventing the swing-back phenomenon that a captured image moves due to the swing of angular velocity data in the opposite direction after panning. During panning, the processing shown in the flowchart of FIG. 2A, 2B, 12A, or 12B is executed, and a description thereof will not be repeated in this embodiment.

In step S601 of FIG. 15, the panning control circuit 112 determines whether a flag PAN_START_FLAG representing that panning has started is set. Upon determining that PAN_

START_FLAG is not set, the panning control circuit 112 advances the process to step S602.

In step S602, the panning control circuit 112 determines whether angular velocity data (GYRO_DATA) output from the A/D converter 14 is larger than a panning start determination angular velocity threshold IN_THRESH5.

Upon determining in step S602 that GYRO_DATA is larger than IN_THRESH5, the panning control circuit 112 determines that the panning operation of the image capturing apparatus has started, and the process advances to step S604 and then to step S606. In step S604, the panning control circuit 112 resets SIGN_FLAG3, and stores the sign (positive) of the angular velocity data at the start of panning. In step S606, the panning control circuit 112 sets the flag PAN_START_FLAG representing that the panning operation has started.

Upon determining in step S602 that GYRO_DATA is equal to or smaller than IN_THRESH5, the panning control circuit 112 advances the process to step S603. In step S603, the panning control circuit 112 determines whether the angular velocity data (GYRO_DATA) output from the A/D converter 14 is smaller than a panning start determination angular velocity threshold −IN_THRESH5.

Upon determining in step S603 that GYRO_DATA is smaller than −IN_THRESH5, the panning control circuit 112 determines that the panning operation of the image capturing apparatus has started, and the process advances to step S605 and then to step S606. In step S605, the panning control circuit 112 sets SIGN_FLAG3, and stores the sign (negative) of the angular velocity data at the start of the panning operation. In step S606, the panning control circuit 112 sets the flag PAN_START_FLAG representing that the panning operation has started.

After the process in step S606, or upon determining in step S603 that GYRO_DATA is equal to or larger than −IN_THRESH5, the panning control circuit 112 ends the processing, and waits for the start of next processing.

If PAN_START_FLAG is set in step S601, it has been determined that the panning operation is being performed, and the panning control circuit 112 advances the process to step S607. In step S607, the panning control circuit 112 determines whether a flag PAN_CANCEL_FLAG representing that the panning operation has ended is set. Upon determining that PAN_CANCEL_FLAG is not set, the panning control circuit 112 advances the process to step S608.

In step S608, the panning control circuit 112 counts a time PAN_TIME after PAN_START_FLAG has been set, and the process advances to step S609.

In step S609, the panning control circuit 112 determines whether SIGN_FLAG3 is set. Upon determining in step S609 that SIGN_FLAG3 is set, that is, if the sign of the angular velocity data at the start of the panning operation is negative, the panning control circuit 112 advances the process to step S610.

In step S610, the panning control circuit 112 computes the minimum value of the angular velocity data (GYRO_DATA) output from the A/D converter 14 as a peak value during the period when it is determined that the panning operation is progressing. The panning control circuit 112 sets the minimum value in a variable GYRO_PEAK, and the process advances to step S611.

In step S611, the panning control circuit 112 determines whether GYRO_DATA is equal to or larger than zero. Upon determining in step S611 that GYRO_DATA is equal to or larger than zero, the panning control circuit 112 advances the process to step S614 to set the flag PAN_CANCEL_FLAG representing that the panning operation has ended.

Upon determining in step S609 that SIGN_FLAG3 is not set, that is, if the sign of the angular velocity data at the start of the panning operation is positive, the panning control circuit 112 advances the process to step S612. In step S612, the panning control circuit 112 computes the maximum value of the angular velocity data (GYRO_DATA) output from the A/D converter 14 as a peak value during the period when it is determined that the panning operation is progressing. The panning control circuit 112 sets the maximum value in the variable GYRO_PEAK, and the process advances to step S613.

In step S613, the panning control circuit 112 determines whether GYRO_DATA is equal to or smaller than zero. Upon determining in step S613 that GYRO_DATA is equal to or smaller than zero, the panning control circuit 112 advances the process to step S614 to set the flag PAN_CANCEL_FLAG representing that the panning operation has ended.

After the end of the process in step S614, upon determining in step S611 that GYRO_DATA is smaller than zero, or upon determining in step S613 that GYRO_DATA is larger than zero, the panning control circuit 112 ends the processing, and waits for the start of next processing.

If PAN_CANCEL_FLAG is set in step S607, it has been determined that the panning operation had ended, and the panning control circuit 112 advances the process to step S615.

In step S615, the panning control circuit 112 counts a time CANCEL_TIME after PAN_CANCEL_FLAG has been set, and the process advances to step S616.

In step S616, the panning control circuit 112 computes the value of OFFSET_CANCEL as a signal value to be set in the output of an offset change circuit 106 to remove a signal component that is contained in the angular velocity data and swings in the direction opposite to panning. The method of computing OFFSET_CANCEL will be described with reference to FIGS. 17A to 17C.

The panning control circuit 112 decides the value of OFFSET_CANCEL in accordance with the time CANCEL_TIME from the end of the panning operation, the time PAN_TIME from the start of the panning operation, and the value of the peak GYRO_PEAK of the angular velocity data during the panning operation. The parameter to be decided in accordance with CANCEL_TIME will be defined as OFFSET_CANCEL_ORIGINAL, the parameter to be decided in accordance with PAN_TIME will be defined as PAN_TIME_GAIN, and the parameter to be decided in accordance with GYRO_PEAK will be defined as GYRO_PEAK_GAIN. At this time, the panning control circuit 112 computes the value of OFFSET_CANCEL by $$\text{OFFSET\_CANCEL} = \text{OFFSET\_CANCEL\_ORIGINAL} \times \text{PAN\_TIME\_GAIN} \times \text{GYRO\_PEAK\_GAIN} \qquad (2)$$

FIG. 17A is a graph showing the relationship between the time CANCEL_TIME from the end of the panning operation and OFFSET_CANCEL_ORIGINAL. The value of OFFSET_CANCEL_ORIGINAL increases toward CANCEL_PEAK until the value of CANCEL_TIME reaches PEAK_TIME (first predetermined time). After PEAK_TIME (after the elapse of the first predetermined time), the value of OFFSET_CANCEL_ORIGINAL gradually decreases until the value of CANCEL_TIME reaches CANCEL_END (second predetermined time). When CANCEL_TIME has reached CANCEL_END, the value of OFFSET_CANCEL_ORIGINAL becomes zero. Note that FIG. 17A has a time-rate characteristic approximated to the time-rate change of angular velocity data during the swing-back period shown in FIG. 16A. The time-rate change of angular velocity data during the swing-back period is measured in advance so that CANCEL_ORIGINAL approximated to it can be prepared in advance. Note that the relationship shown in FIG. 17A can be stored as table data in a nonvolatile memory provided in the panning control circuit 112 or the image capturing apparatus including a blur correction apparatus 100, like the above-described various kinds of thresholds and parameters. Alternatively, only the values of OFFSET_CANCEL_ORIGINAL at representative timings such as PEAK_TIME, CANCEL_END, and CANCEL_PEAK in FIG. 17A may be stored in the nonvolatile memory, and values at the other timings may be computed by interpolation.

FIG. 17B is a graph showing the relationship between PAN_TIME and PAN_TIME_GAIN. PAN_TIME_GAIN is a coefficient that multiplies OFFSET_CANCEL_ORIGINAL. The value of PAN_TIME_GAIN is zero until PAN_TIME exceeds a threshold TIME_THRESH. When PAN_TIME falls within the range from the threshold TIME_THRESH (exclusive) to TIME_MAX (10th threshold) (inclusive), the value of PAN_TIME_GAIN is increased along with an increase in the value of PAN_TIME. When PAN_TIME exceeds the 10th threshold TIME_MAX, the value of PAN_TIME_GAIN is fixed at the maximum value "1".

FIG. 17C is a graph showing the relationship between GYRO_PEAK and GYRO_PEAK_GAIN. GYRO_PEAK_GAIN is a coefficient that multiplies OFFSET_CANCEL_ORIGINAL, like PAN_TIME_GAIN. When the absolute value of GYRO_PEAK is smaller than the panning start determination angular velocity threshold IN_THRESH5 (smaller than the 11th threshold), the value of GYRO_PEAK_GAIN is zero. When GYRO_PEAK falls within the range from IN_THRESH5 (inclusive) to GYRO_PEAK_MAX (exclusive), the value of GYRO_PEAK_GAIN is increased along with an increase in GYRO_PEAK. When GYRO_PEAK is equal to or larger than GYRO_PEAK_MAX, GYRO_PEAK_GAIN is fixed at the maximum value "1". When GYRO_PEAK falls within the range from –IN_THRESH5 (inclusive) to GYRO_PEAK_MAX (exclusive), the value of GYRO_PEAK_GAIN is decreased along with a decrease in GYRO_PEAK. When GYRO_PEAK is equal to or smaller than –GYRO_PEAK_MAX, GYRO_PEAK_GAIN is fixed at the minimum value "–1".

OFFSET_CANCEL is set as the output signal of the offset change circuit 106 in FIG. 1. This makes it possible to input, to an integrator 16, a result obtained by canceling the swing-back signal component that is contained in the output of an HPF 15 and appears in the direction opposite to the angular velocity of panning at the end of panning using the output of the offset change circuit 106, thereby preventing the swing-back phenomenon.

The characteristic feature of the magnitude of the signal component that is contained in the output of the HPF 15 and swings in the direction opposite to panning will be described here with reference to FIG. 16B. FIG. 16B is a timing chart showing a time-rate change of angular velocity data when three kinds of panning operations are performed. As indicated by the solid line I and dotted line II in FIG. 16B, the signal generated by swing-back is smaller in II in which the peak of angular velocity data during the panning operation is smaller than in I. Hence, when the value of GYRO_PEAK_GAIN is changed in accordance with the peak GYRO_PEAK of angular velocity data during the panning operation, as shown in FIG. 17C, the value of OFFSET_CANCEL can be made similar to that of the actual swing-back component.

Referring to FIG. 16B, the solid line I and the alternate long and short dashed line III with different panning operation durations are compared. The swing-back component is larger in III with the long duration. Hence, when the value of GYRO_PEAK_GAIN is changed in accordance with the time PAN_TIME from the start to the end of the panning operation, as shown in FIG. 17B, the value of OFFSET_CANCEL can be made similar to that of the actual swing-back signal component.

After computing the value of OFFSET_CANCEL in step S616, the panning control circuit 112 advances the process to step S617. In step S617, the panning control circuit 112 determines whether CANCEL_TIME counted in step S615 is equal to or larger than the time CANCEL_END at which the swing-back signal component converges to zero. Upon determining in step S617 that CANCEL_TIME is equal to or larger than CANCEL_END, the panning control circuit 112 advances the process to step S618 and then to step S619 to end the processing of removing the swing-back signal component generated in the direction opposite to panning. In step S618, the panning control circuit 112 sets OFFSET_CANCEL to zero. In step S619, the panning control circuit 112 resets PAN_CANCEL_FLAG and PAN_START_FLAG.

After the process in step S619, or upon determining in step S617 that CANCEL_TIME is smaller than CANCEL_END, the panning control circuit 112 ends the processing, and waits for the start of next processing.

The effectiveness of panning control according to this embodiment will be described next with reference to FIGS. 18A to 18C. FIGS. 18A and 18B show time-rate changes of angular velocity data (GYRO_DATA) and the lower cut-off frequency of the HPF 15, respectively, when the image capturing apparatus including the conventional blur correction apparatus performs a panning operation. FIG. 18C shows a time-rate change of the output (OFFSET_CANCEL) of the offset change circuit 106 when an image capturing apparatus including a blur correction apparatus according to this embodiment performs the same panning operation as in FIG. 18A.

FIG. 18A shows the time-rate change of angular velocity data output from the A/D converter 14 in FIG. 19 to 1 from the start of the panning operation until the swing-back signal component generated after the end of the panning operation converges to zero. FIG. 18B shows the time-rate change of the lower cut-off frequency of the HPF 15 from the start of the above-described panning operation until the swing-back signal component of the angular velocity data generated after the end of the panning operation converges to zero. FIG. 18C shows the time-rate change of the output of the offset change circuit 106 until the swing-back signal component of the angular velocity data converges to zero after the end of the panning operation. Although not illustrated in FIG. 18C, the output of the offset change circuit 106 during the panning operation is the same as in FIG. 5B or 7C.

In the conventional panning control, the panning operation is determined to have started at time T71 when the value of angular velocity data exceeds IN_THRESH5 in FIG. 18A. Then, the lower cut-off frequency of the HPF 15 is raised from the time T71, as shown in FIG. 18B. At time T72 at which the sign of the angular velocity data is inverted in FIG. 18A, the panning operation is determined to have ended. After determining that the panning operation has ended, the lower cut-off frequency of the HPF 15 is gradually returns to the original value. In addition, to attenuate the swing-back signal component after the end of the panning operation, the lower cut-off frequency of the HPF 15 is maintained at a predetermined value up to time T63, instead of decreasing it to the minimum value (original value). After the time T63, the lower cut-off frequency of the HPF 15 is lowered again and returned to the minimum value (original value) at time T64.

According to such panning control, the swing-back signal component after the end of the panning operation is attenuated by the HPF 15, thereby preventing a captured image from moving due to the swing-back signal component. However, as described above, if the lower cut-off frequency of the HPF 15 remains high, the HPF 15 attenuates a shake component to be corrected, too. As a result, the residual shake amount becomes large from the time T72 to T64 after the end of the panning operation.

The panning control circuit 112 of this embodiment is the same as in the prior art in determining the start of the panning operation at the time T71 when the value of the angular velocity data exceeds IN_THRESH5 in FIG. 18A. However, after that, the panning control circuit 112 continues to compute GYRO_PEAK and count PAN_TIME shown in FIG. 18A at a predetermined period up to the time T72 at which the sign of the angular velocity data is inverted. Upon determining at the time T72 that the panning operation has ended, the panning control circuit 112 computes OFFSET_CANCEL in accordance with equation (2) and causes the offset change circuit 106 to output it up to time T73.

Causing an adder-subtractor 108 to subtract OFFSET_CANCEL from the output of the HPF 15 allows to efficiently suppress the swing-back signal component generated after the end of the panning operation and thus suppress the movement of a captured image caused by swing-back. According to the method of this embodiment, since the lower cut-off frequency of the HPF 15 is not changed, the swing-back signal component of angular velocity data generated after the end of the panning operation can be removed without attenuating the shake component to be corrected from shake correction data.

As described above, according to this embodiment, it is possible to effectively suppress the swing-back signal component of angular velocity data generated after the end of the panning operation while avoiding the phenomenon that the residual shake amount becomes large in the conventional panning control which changes the lower cut-off frequency of the HPF 15.

Note that in this embodiment, the panning operation start/end determination and computation of the value of OFFSET_CANCEL are done using the output of the A/D converter 14. However, the same determination and computation can also be performed using the data output from the HPF 15.

When computing the value of OFFSET_CANCEL, the value of the peak GYRO_PEAK of the angular velocity data during the panning operation is used. However, the present invention is not limited to this. For example, the same effect can be obtained using the average value of angular velocity data during the panning operation in place of the peak of angular velocity data.

The preferred embodiments of the present invention have been described above. However, the present invention is not limited to these embodiments, and various changes and modifications can be made within the spirit and scope of the present invention. In addition, a plurality of embodiments may be combined.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2009-167266, filed on Jul. 15, 2009, which is hereby incorporated by reference herein its entirety.

What is claimed is:

1. A blur correction apparatus comprising:
a processor configured to perform functions of a computation unit, a panning determination unit, an offset value generation unit, and a control unit;
the computation unit configured to compute, based on an output of a shake detection unit, data for correcting image shake;
the panning determination unit configured to determine, based on an output of the shake detection unit, whether a panning operation is being done;
the offset value generation unit configured to generate an offset value to be subtracted from the data for correcting image shake; and
the control unit configured to control a shake correction unit based on an output of the shake detection unit, in order to correct image shake,
wherein the offset value is data for approaching the shake correction unit approaching a correction limit to a correction center position,
wherein, if it is determined by said panning determination unit that a panning operation is being done, said control unit controls the shake correction unit based on data obtained by subtracting the offset value from the data for correcting image shake, and
wherein said offset value generation unit generates the offset value so that a first offset value corresponding to a first focal length of an imaging optical system is smaller than a second offset value corresponding to a second focal length of the imaging optical system being smaller than the first focal length.

2. The blur correction apparatus according to claim 1, wherein the shake detection unit is an angular velocity detection unit.

3. The blur correction apparatus according to claim 1, wherein the control unit controls the shake correction unit so that the shake correction unit is driven in a direction different from that of an optical axis of the imaging optical system in order to shift the optical axis, and thereby the image shake is corrected.

4. An image capturing apparatus comprising:
the blur correction apparatus according to claim 1; and
an image sensor.

5. An optical apparatus comprising:
the blur correction apparatus according to claim 1; and
the imaging optical system.

6. The blur correction apparatus according to claim 1, wherein the first offset value corresponding to the first focal length of the imaging optical system decreases as the first focal length increases.

7. A control method of an blur correction apparatus comprising:

a computation step of computing, based on an output of a shake detection unit, data for correcting image shake;

a panning determination step of determining, based on an output of the shake detection unit, whether a panning operation is being done;

an offset value generation step of generating an offset value to be subtracted from the data for correcting image shake; and a control step of controlling a shake correction unit based on an output of the shake detection unit, in order to correct image shake, wherein the offset value is data for approaching the shake correction unit approaching a correction limit to a correction center position, wherein, if it is determined in said panning determination step that a panning operation is being done, in said control step, the shake correction unit is controlled based on data obtained by subtracting the offset value from the data for correcting image shake, and wherein, in said offset value generation step, the offset value is generated so that a first offset value corresponding to a first focal length of an imaging optical system is smaller than a second offset value corresponding to a second focal length of the imaging optical system being smaller than the first focal length.

8. The control method according to claim 7, wherein the first offset value corresponding to the first focal length of the imaging optical system decreases as the first focal length increases.

* * * * *